United States Patent
Fehrenbach et al.

(10) Patent No.: US 11,223,467 B2
(45) Date of Patent: Jan. 11, 2022

(54) LATENCY REDUCTION IN TDD SYSTEMS WITH CARRIER AGGRAGATION

(71) Applicant: Fraunhofer-Gesellschaft zur Foerderung der angewandten Forschung e.V., Munich (DE)

(72) Inventors: Thomas Fehrenbach, Berlin (DE); Dennis Wieruch, Berlin (DE); Bernd Holfeld, Berlin (DE); Thomas Wirth, Kleinmachnow (DE); Cornelius Hellge, Berlin (DE); Lars Thiele, Berlin (DE); Thomas Haustein, Potsdam (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/272,773

(22) Filed: Feb. 11, 2019

(65) Prior Publication Data

US 2019/0173658 A1 Jun. 6, 2019

Related U.S. Application Data

(63) Continuation of application No. PCT/EP2017/070459, filed on Aug. 11, 2017.

(51) Int. Cl.
*H04L 5/14* (2006.01)
*H04L 5/00* (2006.01)
(Continued)

(52) U.S. Cl.
CPC ............ *H04L 5/1469* (2013.01); *H04L 5/001* (2013.01); *H04L 5/0094* (2013.01);
(Continued)

(58) Field of Classification Search
CPC ..... H04L 5/1469; H04L 5/0098; H04L 5/001; H04L 5/0094; H04W 56/001; H04W 72/0446; H04W 72/0453; H04W 74/0833
See application file for complete search history.

(56) References Cited

U.S. PATENT DOCUMENTS 6,330,458 B1 * 12/2001 Lamoureux ............ H01Q 1/246
375/334
2013/0083706 A1 4/2013 Lin
(Continued)

FOREIGN PATENT DOCUMENTS

EP 2672772 A1 12/2013
WO WO-2015090617 A1 * 6/2015 ........ H04W 72/0453
(Continued)

OTHER PUBLICATIONS

ZTE et al.: "Latency Reduction Solutions for TDD", 3GPP Draft; RI-164638 Latency Reduction Solutions for TDD, 3rd Generation Partnership Project (3GPP), Mobile Competence Centre ; 650, Route Des Lucioles ; F-06921 Sophia-Antipolis Cedex; France; vol. RAN WGI, No. Nanjing, China; May 23, 2016-May 27, 2016; May 14, 2016 (May 14, 2016), XP051089954.
(Continued)

*Primary Examiner* — Thai Nguyen
(74) *Attorney, Agent, or Firm* — Perkins Coie LLP; Michael A. Glenn

(57) ABSTRACT

The present invention is concerned with different novel concepts for reducing latency in data transmission. These concepts may be exploited by a transceiver configured to perform wireless data communication with a third party device by aggregating time division duplex carriers having different temporal distribution of uplink times and downlink times. These concepts may further be exploited by an apparatus configured to perform data transmission or reception via allocations of transmission resources of aggregated (Continued)

carriers in units of transmission time intervals into which the aggregated carriers are subdivided, wherein the aggregated carriers are temporally subdivided into the transmission time intervals in a temporal grid, respectively, wherein the aggregated carriers' grids are temporally mutually offset.

23 Claims, 21 Drawing Sheets

(51) Int. Cl.
    *H04W 56/00*     (2009.01)
    *H04W 72/04*     (2009.01)
    *H04W 74/08*     (2009.01)

(52) U.S. Cl.
    CPC ......... *H04L 5/0098* (2013.01); *H04W 56/001* (2013.01); *H04W 72/0446* (2013.01); *H04W 72/0453* (2013.01); *H04W 74/0833* (2013.01)

(56) References Cited

U.S. PATENT DOCUMENTS

| | | |
|---|---|---|
| 2014/0029586 A1 | 1/2014 | Loehr et al. |
| 2015/0085719 A1 | 3/2015 | Yin et al. |
| 2015/0124743 A1* | 5/2015 | Damnjanovic ....... H04L 5/0032 370/329 |
| 2015/0195070 A1 | 7/2015 | Kim et al. |
| 2016/0226650 A1* | 8/2016 | Chen ....................... H04L 5/001 |

FOREIGN PATENT DOCUMENTS

| | | |
|---|---|---|
| WO | 2015/134907 A1 | 9/2015 |
| WO | 2016122845 A1 | 8/2016 |

OTHER PUBLICATIONS

3GPP TS36.211 V13.1.0 (Apr. 2016), "E-UTRA; Physical channels and modulation", (Release 13).
3GPP TR36.881 V0.6.0 (Feb. 2016), "Study on latency reduction techniques for LTE" (Release 13).
C. Johnson, "Long Term Evolution in Bullets", 2nd edition, 2012. http://www.sharetechnote.com/html/LTE_TDD_Overview.html, retrieved on Feb. 12, 2019.
http://niviuk.free.fr/lte_resource_grid.html, retrieved on Feb. 21, 2019.
3GPP TS 36.213 V13.2.0 (Aug. 2016), "E-UTRA; Physical layer procedures", Chapter 13.
3GPP TS 36.300 V13.3.0 (Apr. 2016), "E-UTRA; Overall description; Stage 2", Chapter 23.5.

\* cited by examiner

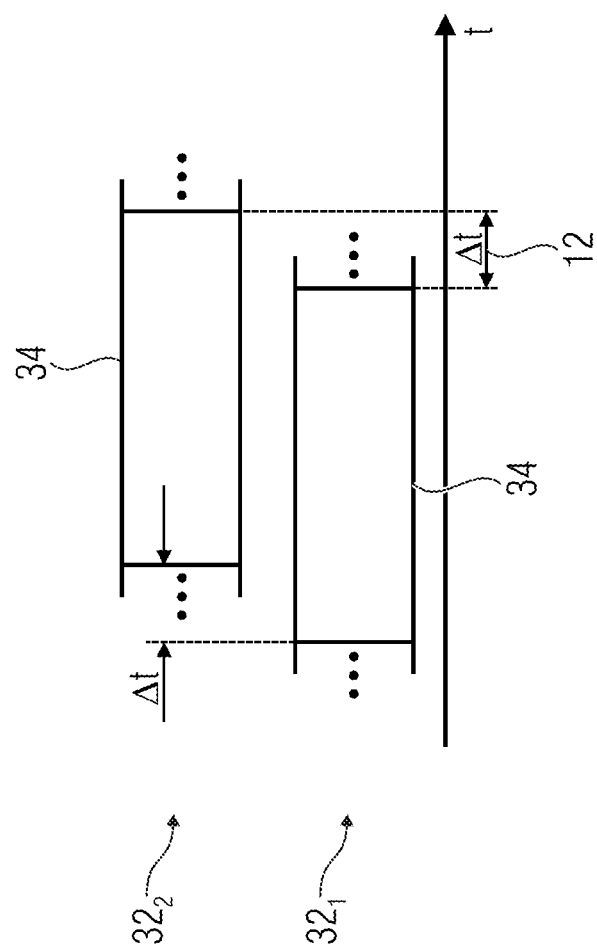

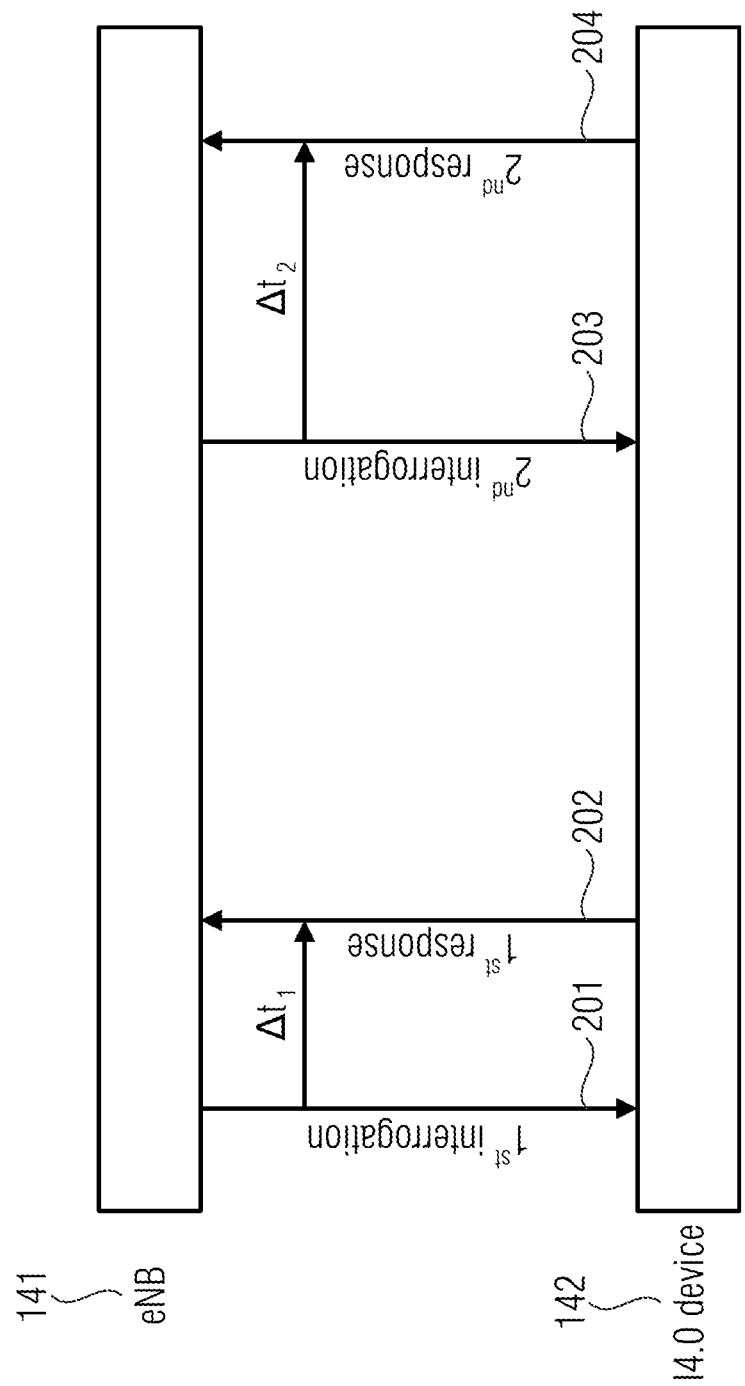

Figure 21

211 — permanent single stream UL and DL operation

| antenna 1 transmit mode | | | antenna 2 receive mode | | |
|---|---|---|---|---|---|
| UL | CC-A | OFF | OFF | CC-A | DL |
| OFF | CC-A | UL | DL | CC-A | OFF |
| UL | CC-A | OFF | OFF | CC-A | DL |
| OFF | CC-A | UL | DL | CC-A | OFF |
| UL | CC-A | OFF | OFF | CC-A | DL |
| OFF | CC-A | UL | DL | CC-A | OFF |

212 — permanent dual stream UL and DL operation switch between two transmit antennas on CC-A and then two antennas on CC-B

| antenna 1 transmit mode | | | antenna 2 transmit mode | | | antenna 3 receive mode | | | antenna 4 receive mode | | |
|---|---|---|---|---|---|---|---|---|---|---|---|
| UL | CC-A | OFF | OFF | CC-B | OFF | OFF | CC-A | DL | OFF | CC-B | DL |
| OFF | CC-A | UL | UL | CC-B | OFF | DL | CC-A | OFF | DL | CC-B | OFF |
| UL | CC-A | OFF | OFF | CC-B | UL | OFF | CC-A | DL | OFF | CC-B | DL |
| OFF | CC-A | UL | UL | CC-B | OFF | DL | CC-A | OFF | DL | CC-B | OFF |
| UL | CC-A | OFF | OFF | CC-B | UL | OFF | CC-A | DL | OFF | CC-B | DL |
| OFF | CC-A | UL | UL | CC-B | OFF | DL | CC-A | OFF | DL | CC-B | OFF |

213 — permanent dual stream UL and DL operation always using one transmit antenna on CC-A and another transmit antenna on CC-B

| antenna 1 transmit mode | | | antenna 2 transmit mode | | | antenna 3 receive mode | | | antenna 4 receive mode | | |
|---|---|---|---|---|---|---|---|---|---|---|---|
| UL | CC-A | OFF | OFF | CC-B | UL | DL | CC-A | OFF | OFF | CC-B | DL |
| OFF | CC-A | UL | UL | CC-B | OFF | OFF | CC-A | DL | DL | CC-B | OFF |
| UL | CC-A | OFF | OFF | CC-B | UL | DL | CC-A | OFF | OFF | CC-B | DL |
| OFF | CC-A | UL | UL | CC-B | OFF | OFF | CC-A | DL | DL | CC-B | OFF |
| UL | CC-A | OFF | OFF | CC-B | UL | DL | CC-A | OFF | OFF | CC-B | DL |
| OFF | CC-A | UL | UL | CC-B | OFF | OFF | CC-A | DL | DL | CC-B | OFF |

| R4-170xxx | 2GHz | 2.5GHz | 3.5GHz | 6GHz | 24GHz | 43.5GHz | 52.3GHz |
|---|---|---|---|---|---|---|---|
| example #1 | 15k, 30k, 60k | | | | 120k, 240k | | |
| example #2 | 15k | 30k | 60k | 120k | | | |
| | | | | 240k | | | |
| example #3 | 15k, 30k, 60k | | | 60k, 120k, 240k, 480k (*) | | | |
| example #4 | 15k, 30k, 60k | | | | | | |
| example #5 | 15k, 30k, 60k | | | 60k, 120k | | | |

Figure 23

LATENCY REDUCTION IN TDD SYSTEMS WITH CARRIER AGGRAGATION

CROSS-REFERENCE TO RELATED APPLICATIONS

This application is a continuation of copending International Application No. PCT/EP2017/070459, filed Aug. 11, 2017, which is incorporated herein by reference in its entirety, and additionally claims priority from European Application No. EP 16183899.0, filed Aug. 11, 2016, which is also incorporated herein by reference in its entirety.

The present application is concerned with concepts for reducing latency in data transmission wherein such concepts might, for instance, be used in systems such as the upcoming 3GPP LTE advanced framework.

BACKGROUND OF THE INVENTION

For latency constraint services, the switching delay between uplink (UL) and downlink (DL) in time domain duplex (TDD) operation is not fast enough with a current 3GPP LTE specification. The introduction of short transmission time intervals (sTTI) [2] below subframe size can reduce latency to some extent. However, with the currently supported frame configurations for TDD UL-DL the options for switching intervals are still limited and do not allow frequent or alternating UL/DL switches, see the Table 1 for the different configurations of LTE frame structure type 2 which is also depicted in FIG. 1.

One (radio) frame consists of multiple subframes, each representing one of the transmission modes 'D' (Downlink), 'U' (Uplink) and 'S' (Special).

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As depicted in FIG. 1, each frame is a certain time $T_f$ long and is composed of, or is temporally sub-divided into, a sequence of consecutive subframes, namely ten subframes in case of LTE. Since the frame depicted in FIG. 1 is exemplarily of a frame structure type 2, it is sub-divided or structured into two half-frames with each being composed of five subframes.

The second subframe in each of these half-frames, i.e., the second and seventh frame within the whole frame, are of transmission mode 'S'. The subframes number #1 and number #6 are temporally sub-divided into three consecutive time slots, namely a Downlink Pilot Timeslot (DwPTS), followed by a guard period (GP), even followed by an Uplink Pilot Timeslot (UpPTS).

The other subframes of the frame, i.e. subframes #0, #2, #3, #4, #5, #7, #8 and #9 are either of transmission mode 'D' (Downlink) or 'U' (Uplink), each of these subframes being sub-divided into two or more segments, called slots. As shown later on, each subframe may be composed of fourteen consecutive symbols.

It is known from [1] that a special subframe of transmission mode 'S' with a certain guard period (GP) may enable the switch from DL to UL transmission while it is not needed for the UL to DL switch. See, accordingly, the configurations 0 to 6 listed in Table 1 above.

Subframes immediately following any 'S' subframe form a run of one or more U' subframes, i.e. subframes of transmission mode 'U', wherein such 'U' subframe run may immediately be followed by a 'D' subframe without any 'S' subframe therebetween, but a switching back to transmission mode 'U' then involves the occurrence of an 'S' subframe.

In each configuration option of the TDD radio frame, subframes #0 and #5 and the time slot DwPTS may be reserved for downlink transmission (downlink subframe D'). On the other hand, time slots UpPTS and the subframe immediately following any special subframe 'S' may be reserved for UL transmission. In general, a dynamic change between the LTE TDD UL-DL configurations is not envisaged.

However, mechanisms are available in LTE to change the configuration on a slow basis [6,7]. As specified in Table 1 above, UL-DL configurations with both 5 ms and 10 ms downlink-to-uplink switch-point periodicity are supported.

In case of 5 ms downlink-to-uplink switch-point periodicity, the special subframe exists in both half-frames.

In case of 10 ms downlink-to-uplink switch-point periodicity, the special subframe exists in the first half-frame only.

From [3] it is known that carrier aggregation (CA) increases the channel bandwidth by combining multiple RF carriers. Each individual carrier is denoted as a component carrier (CC). The primary component carrier is also described as the anchor carrier, while the additional carriers are often denoted as the secondary CCs. Terms like first and second carriers are, however, merely to distinguish different carriers without qualifying them to be any of primary and secondary CC.

A CC can either be UL and DL, or DL only but cannot be UL only. In case of TDD, the UL-DL configuration needs to be the same for all CCs. All CCs may belong to the same eNB, i.e. a base station, and may be synchronized on the air-interface, i.e. a single set of timing advance commands are used for all CCs.

CA categorizes cells as "Primary cell" using a primary RF carrier and "Secondary cell" using a secondary RF carrier. Each connection can have multiple secondary cells and, hence, CCs.

Cross-carrier scheduling refers to the network using PDCCH signaling on RF carrier 'x' to allocate resources on RF carrier 'y'. It avoids the UE having to check the PDCCH transmissions on every CC.

When multiple antennas are used for TDD operation or, alternatively speaking, when multi-antenna systems are used, it has to be considered that TDD switches are typically operated between the transceiver and the antenna port which causes significant power leakage and results in self-interference between multiple antennas belonging to the same device, e.g. a smartphone.

Some of the above techniques allow for some "adjustment" of the latency of data transmission. For instance, the configurations listed in Table 1 above are associated with different downlink and/or uplink latencies and, accordingly, selecting therebetween allows for setting an appropriate latency.

SUMMARY

An embodiment may have a transceiver configured to perform wireless data communication with a third party device by aggregating time division duplex (TDD) carriers having different temporal distribution of uplink times and downlink times.

Another embodiment may have an apparatus configured to perform data transmission or reception via allocations of transmission resources of aggregated carriers in units of transmission time intervals (TTI) into which the aggregated carriers are subdivided, wherein the aggregated carriers are temporally subdivided into the transmission time intervals in a temporal grid, respectively, wherein the aggregated carriers' grids are temporally mutually offset.

Another embodiment may have an apparatus configured to perform data transmission or reception via allocations of transmission resources of aggregated carriers, wherein at least one of physical layer channels of the aggregated carriers, radio frame bases of physical broadcast channels of the aggregated carriers, and physical random access channels of the aggregated carriers are temporally mutually offset.

Another embodiment may have a base transceiver configured to communicate with user entity transceivers via one or more carriers, the base transceiver configured to allocate transmission resources of the one or more carriers to the user entity transceivers for communication with the user entity transceivers in units of transmission time intervals into which the one or more carriers are temporally subdivided, and temporally adjust the begin and/or end of transmission time intervals of at least one of the one or more carriers depending on one more signals received from one of the user entity transceivers.

Another embodiment may have a user entity transceiver configured to communicate with a base transceiver system via allocated transmission resources in units of transmission time intervals into which one or more carriers are temporally subdivided, the user entity transceiver being configured to temporally adjust the begin and/or end of transmission time intervals of at least one of the one or more carriers to be aligned to a local clock by depending on the local clock, send one or more signals to the base station system on the basis of which the base station system is to perform the temporal adjustment on a base transceiver system's side, and temporally adjust the begin and/or end of transmission time intervals of the at least one of the one or more carriers to correspond to the local clock on an user entity transceiver's side.

Another embodiment may have a base station system comprising a first base station and a second base station, the base station system being configured to perform wireless communication with a mobile terminal by aggregating a first carrier at the first base station and a second carrier at the second base station, configure the first and second carriers, and send first configuration signals for correspondingly configuring the first and second carriers at the mobile terminal, to the mobile terminal via the first carrier, and sending second configuration signals for correspondingly configuring the first and second carriers at the mobile terminal, to the mobile terminal via the second carrier, wherein the base station system is configured to send the first configuration signals to the mobile terminal less frequently than the second configuration signals.

Another embodiment may have a mobile terminal configured to perform wireless communication with a base station system comprising a first base station and a second base station by aggregating a first component carrier at the first base station and a second component carrier at the second base station, receive first configuration signals from the base station system via at least one of the component carriers and second configuration signals from the base station system via at least one of the component carriers, and configure the first and second component carriers depending on the first and second configuration signals, wherein the mobile terminal is configured to derive the configuration signals from the first component carrier less frequently than the configuration signals from the second component carrier.

In accordance with a first aspect of the present application, reduction in latency of data transmission is achieved by performing wireless data communication with a third party device by aggregating time division duplex (TDD) carriers having different temporal distribution of uplink times and downlink times, i.e. aggregating TDD carriers comprising, for at least some temporal occasions, advantageously more than 50% of the time and even advantageously more than 80% of the time, one TDD carrier being an uplink mode while, at the same time, another of the TDD carriers is in the downlink mode.

By this measure, the data transmission latency is reduced in both downlink and uplink directions, i.e. the time to wait to transmit something in a downlink or uplink direction since in the above mentioned times both transmission directions are available, i.e. uplink and downlink.

In accordance with an embodiment of the present application, the TDD carriers are temporally structured into consecutive frames of a frame length which is equal between the TDD carriers, and wherein the frames of a first and a second of the TDD carriers are temporally shifted to each other. The temporal shift is transparent for legacy users or transceivers not using carrier aggregation as long as the used TDD carrier structures of the TDD carriers used for carrier aggregation are already known to such legacy users or legacy transceivers.

As far as the TDD carriers aggregated are concerned, it is noted that same may connect a transceiver with one base station or, alternatively, different ones of the TDD carriers aggregated may connect one UE or transceiver with different base stations. Moreover, TDD carriers aggregated may, in frequency, immediately neighbor each other or may be, in frequency, separated from each other.

In accordance with a further embodiment, the TDD carriers are temporally structured into consecutive frames of a frame length which is equal between the TDD carriers, wherein temporally overlapping frames of the TDD carriers are temporally registered to each other to temporally coincide.

A group of frame configurations is supported. The frame configurations of this group are equally subdivided into a sequence of subframes with each subframe being associated with one of an uplink mode, a downlink mode and one or more special modes corresponding to a predetermined below-subframe temporal distribution of uplink and downlink. The group of frame configurations comprises a first subset of frame configurations differing in distribution of, and frequency of, subframes associated with the uplink and downlink modes, and a second subset of frame configurations from the second subset comprising at least one inverted frame configuration for each frame configuration of the first subset so that there is no—with respect to frame borders—temporally co-located pair of subframes in the respective frame configuration of the first subset and the at least one frame configuration of the second subset of which one is associated with uplink mode while the other of the pair is associated with the downlink mode.

In other words, a transceiver which is able to take advantage of the carrier aggregation of TDD carriers of different temporal distribution of uplink times and downlink times is able to support the above mentioned group of frame configurations and is, thus, able to aggregate, for instance, one TDD carrier of a frame configuration of the first subset with a further TDD carrier of the frame configuration of the second subset, namely the "at least one inverted frame configuration". Here, synchrony between the frames of the aggregated component carriers may be maintained. User entities not supporting frame configurations of the two subsets so as to aggregate carriers of frame configurations being a member of different ones of the subsets and inverse relative to each other may perform data communication without carrier aggregation.

A further aspect of the invention concerns a base transceiver configured to communicate with user entity transceivers via one or more carriers. The base transceiver is configured to allocate transmission resources of the one or more carriers to the user entity transceivers for communication with the user entity transceivers in units of transmission time intervals (TTI) into which the one or more carriers are temporally subdivided. Furthermore, the base transceiver is configured to temporally adjust the begin and/or end of transmission time intervals (TTI) of at least one of the one or more carriers depending on one more signals received from one of the user entity transceivers. In other words, carriers having different TTIs may be synchronized by adapting the TTI slots to each other, for example by providing time offsets and/or idle times. The user entity may, for instance, send a signal to the base transceiver from which the base transceiver may determine the offset and/or idle time to be applied.

BRIEF DESCRIPTION OF THE DRAWINGS

Embodiments of the present invention will be detailed subsequently referring to the appended drawings, in which:

FIG. 5 shows a first example for continuous and accelerated UL/DL access, FIG. 6 shows a second example for continuous and accelerated UL/DL access, FIG. 11 shows an example of two aggregated carriers being shifted in time relative to each other according to an embodiment, FIG. 20 shows an example of providing adapted TTI timing according to an embodiment, FIG. 21 shows mode tables of antennas within a multi-antenna system using aggregated carriers according to an embodiment, FIG. 23 shows an example of subcarrier spacing in different frequency bands.

DETAILED DESCRIPTION OF THE INVENTION

Figure 1:
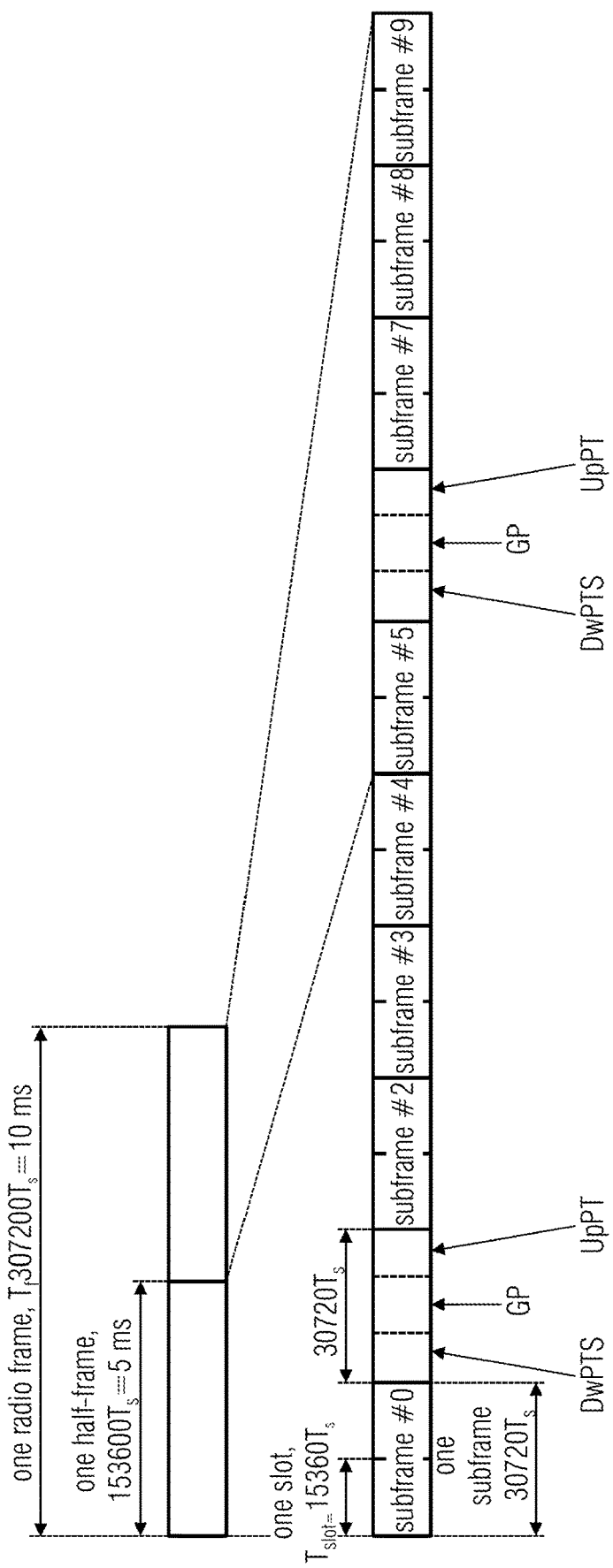
FIG. 1 shows a Frame structure type 2 (TDD) for 5 ms switch-point periodicity, taken from reference [1]

In the following, examples and embodiments of the present invention will be described with reference to the appended Figures. Equal or equivalent elements or elements with equal or equivalent functionality may be denoted in the following description by equal or equivalent reference numerals.

The following description starts with an introductory portion followed by different sections in which the examples and embodiments of the present invention will be described in detail.

1. TDD DL-UL Configurations

In the following, various aspects of the present application, and embodiments thereof, are described. The following description starts with an aspect of the present application according to which data transmission latency is reduced by aggregating TDD carriers having different temporal distribution of uplink times and downlink times. The description starts with embodiments which achieve the difference in temporal distribution of uplink and downlink times by shifting otherwise identical frame configurations of the aggregated TDD carriers. Later on, embodiments follow which efficiently achieve data transmission latency reduction by extending the supported set of frame configurations so as to comprise pairs of 'inverse' frame configurations. Subsequently, embodiments are presented which more generally cover the aspect of these embodiments. Subsequently, further aspects of the present application are described in a similar manner.

Generally speaking, using carrier aggregation in TDD operation with different UL-DL configurations on the multiple carriers could help supporting an accelerated and continuous data flow for both UL and DL while simultaneously benefiting from the extended bandwidth.

In case multiple cells with different UL-DL configurations in the current radio frame are aggregated and the UE is not capable of simultaneous reception and transmission in the aggregated cells (not full duplex capable using aggregated carriers), the following constraints may apply:

if the subframe in the primary cell is a downlink subframe, the UE shall not transmit any signal or channel on a secondary cell in the same subframe if the subframe in the primary cell is an uplink subframe, the UE is not expected to receive any downlink transmissions on a secondary cell in the same subframe if the subframe in the primary cell is a special subframe and the same subframe in a secondary cell is a downlink subframe, the UE is not expected to receive Physical Downlink Shared Channel (PDSCH), Enhanced Physical Downlink Control Channel (EPDCCH), Physical Multicast Channel (PMCH), or Positioning Reference Signal (PRS) transmissions in the secondary cell in the same subframe, and the UE is not expected to receive any other signals on the secondary cell in OFDM symbols that overlaps with the guard period or UpPTS in the primary cell.

2. Overview of Aspects and Embodiments of the Inventive Concept

For ease of understanding, the following description is divided into individual sections, each of which concerns one or more aspects, examples and embodiments of the present invention:

Section 2.1: Fast UL/DL switching on subframe (TTI) level by TDD carrier aggregation
  Section 2.1.1: Enhancements with TDD UL/DL configurations and subframe shifting on aggregated TDD carriers
  Section 2.1.2: Distributed operation for TDD carrier aggregation
    Section 2.1.2.1: U-plane and C-plane splitting concept
    Section 2.1.2.2: Bridging transitions between neighboring cells
    Section 2.1.2.3: Different carrier frequencies
    Section 2.1.2.4: Different beams transmitted from the same base station operated at different TDD UL-DL configurations
    Section 2.1.2.5: component carriers operating on a different TTI basis (e.g. sTTI vs. TTI)
  Section 2.1.3: Enhancements with inverted TDD UL/DL configurations on aggregated TDD carriers
    section 2.1.3.1: TDD UL-DL configuration examples with new UL-DL special subframe
  Section 2.1.4: Interference mitigation between time-shifted aggregated TDD carriers operating in neighbor bands
    Section 2.1.4.1: Blanking of outer subbands
    Section 2.1.4.2 Interference cancellation techniques
  Section 2.1.5: Further Embodiments
Section 2.2: Accelerated UL and/or DL access through time-offsets within TTI length for aggregated carriers (FDD/TDD-independent)
  Section 2.2.1: Externally triggered clock for base station
    Section 2.2.1.1: Adjust clock of base station by time offset
    Section 2.2.1.2: Set idle time for arbitrary system clocks
    Section 2.2.1.3: Incorporate timing advance
    Section 2.2.1.4: Support of multi-stage application cycles
  Section 2.2.2: Time-offsets only for a set of physical layer channels on aggregated carriers
  Section 2.2.3: Further embodiments
Section 2.3: Extended dual TDD operation using multiple (e.g. two or more) antennas with carrier aggregation and inverted switching points 2.1. Fast UL/DL Switching on Subframe (TTI) Level by TDD Carrier Aggregation One possibility to reduce data transmission latency by providing (almost) continuous UL and/or DL transmission is to use carrier aggregation (CA) where CCs with different TDD UL-DL configurations being time-shifted are established in CA mode.

The UL-DL configurations are selected in such a way that a desired UL/DL ratio is obtained and (almost) continuous transmission is kept. In a more particular manner, carrier aggregation may be performed in the following way where
  (i) CCs utilize the same supported TDD band UL-DL configurations being time-shifted on the basis of a subframe or TTI lengths, or
  (ii) CCs utilize TDD bands with different and complimentary UL-DL configurations which are introduced below.

If a CC may switch the TDD UL-DL configuration, the transition between the two configurations can be simply be executed as in the default procedure described in [6,7].

However, an adjustment of the shift of the secondary CCs to the anchor CC can be advantageous to optimize the overall UL/DL ratio in respect to the continuous transmission. In this case, a temporary evacuation may help to set up the corresponding shift.

The concepts described below may also be applicable for TTIs different to subframe basis, e.g. sTTI.

2.1.1 Enhancements with TDD UL/DL Configurations and Subframe Shifting on Aggregated TDD Carriers Such as TDD UL/DL Configurations Currently Existing in LTE To achieve continuous or almost continuous UL and/or DL transmissions, CA with two or more LTE TDD carriers may be used.

Figure 2:
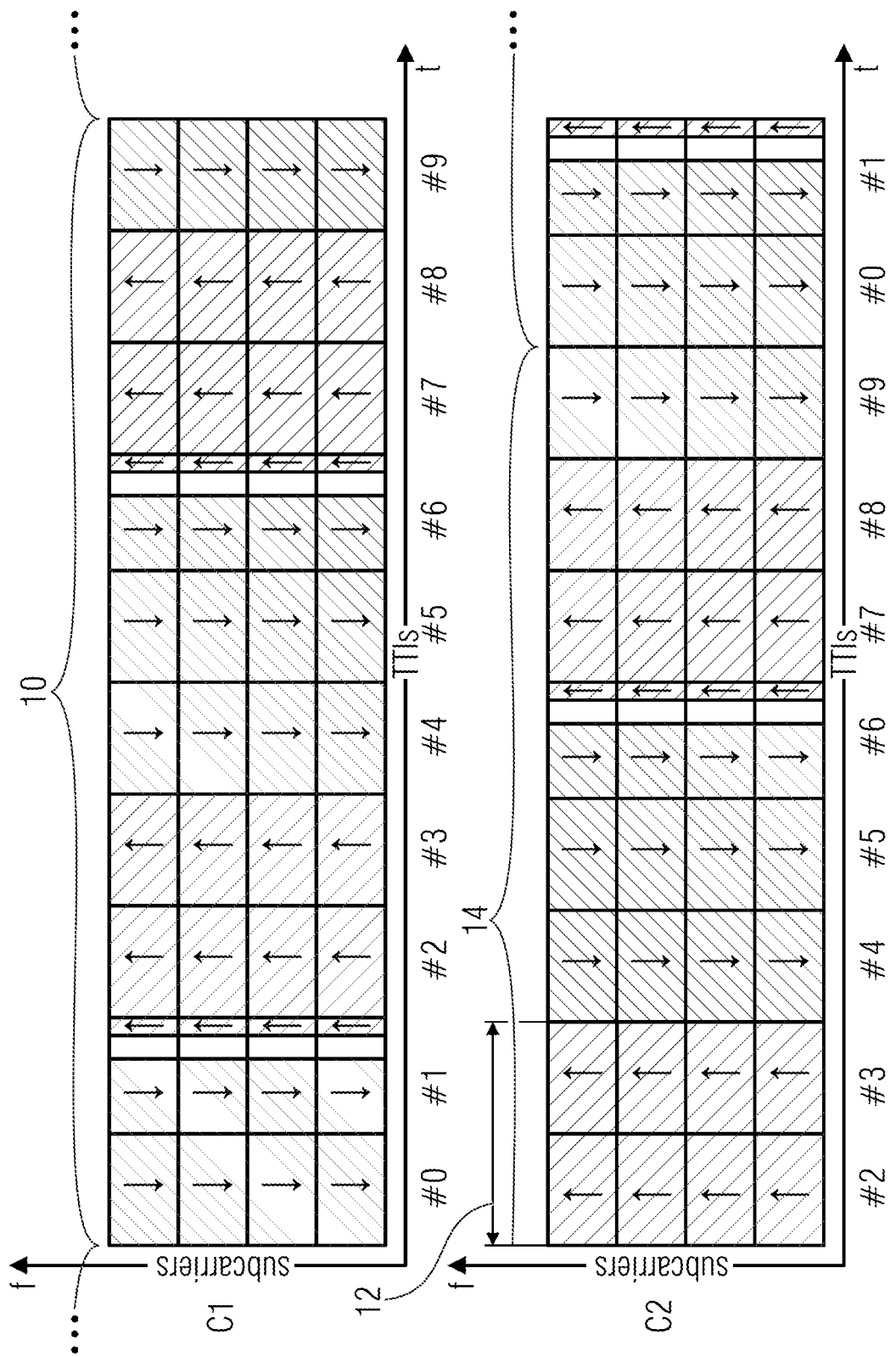
FIG. 2 shows an aggregation of two aligned TDD carriers C1 and C2 both in UL-DL Configuration 1 with a subframe offset of two subframes in the second carrier for almost continuous UL and DL transmission.

In FIG. 2, two legacy compatible TDD carriers C1, C2 with the same TDD UL-DL configuration (here configuration 1 of Table 1) are used. That is, FIG. 2 shows the spectrotemporal distribution of uplink and downlink resources to aggregated component carriers C1 and C2 one on top of the other. For both component carriers C1 and C2, a two-dimensional graph spanned by a time axis t horizontally and a frequency axis f vertically are depicted, and the time axes are registered to each other so that a certain time instant in the graph concerning component carrier C1 coincides with the time instant at the same horizontal position exactly below in the graph concerning component carrier C2.

As can be seen, both component carriers C1 and C2 are of the same frame configuration, with the frames, however, of component carrier C1 being temporally shifted with respect to the frames of component carrier C2 by two subframes.

In particular, FIG. 2 exemplarily shows a temporal portion exactly corresponding to one frame 10 of FIG. 1 although it is clear and illustrated at the left-hand and right-hand sides in FIG. 2 by dotted lines that corresponding frames precede and succeed frame 10 of component carrier 1 as depicted.

According to the frame configuration of frame 10 of component carrier C1, this frame 10 is sub-divided into ten subframes indicated with #0 to #9. To be more precise, the frame configuration depicted in FIG. 2 corresponds to the frame configuration described above with respect to Table 1 and FIG. 1. That is, the frame configuration is here exemplarily corresponding to LTE, but it should be clear that embodiments of the present application are not restricted to this sort of configuration.

To be even more precise, the temporal sub-division of frame 10 into subframes #0 to #9 corresponds to frame configuration '1' of Table 1 with arrows within spectrotemporal tiles, i.e. the rectangles in FIG. 2, pointing downwards, corresponding to carrier communication resources dedicated to downlink, while an arrow pointing upward indicates communication resources reserved for uplink transmissions.

Accordingly, frame 10 of component carrier C1 is temporarily sub-divided into a sequence of ten subframes #0 to #9 sequentially associated with (in consecutive order from left to right): downlink (#0), special subframe (#1), uplink (#2), uplink (#3), downlink (#4), downlink (#5), special subframe (#6), uplink (#7), uplink (#8) and downlink (#9).

The spectral (i.e. vertical) sub-division into four spectral regions depicted in FIG. 2 serves for illustration purposes only and is of no special interest here. Component carrier C2 is shifted by two subframes relative to component carrier C1. That is, the framing of component carrier C2 is shifted by time shift 12 relative to the framing of component carrier C1. The frames 14 of component carrier C2 are the same frame configuration as frames 10 of component carrier C1.

Due to the relative temporal shift 12 between frames 10 of component carrier C1 and frames 14 of component carrier C2 which is, in case of FIG. 2, two subframes long, the uplink subframes or phases of component carrier C2 align with the downlink subframes or phases of component carrier C1.

Other shifting offsets 12 might be used as well although the alignment depicted in FIG. 2 results into a more complementary assignment of downlink and uplink phases, thereby achieving a better reduction of data transmission latency: whenever data is to be transmitted in an uplink direction, either one of component carrier C1 and component carrier C2 has an uplink opportunity as either one of component carriers C2 and C1 has, for each temporal occasion, one of an uplink subframe or special subframe, wherein said special subframes may comprise both downlink and uplink resources, namely before and after the guard period, respectively.

Note that while both carriers C1 and C2 are individually legacy compatible/backward compatible, i.e. a legacy UE can connect to either one of the carriers C1 and C2, carrier aggregation with legacy UEs may currently not be fully supported by LTE as aggregated CCs may need to be synchronized (which may not be the case when they are shifted).

Subframe shifting on aggregated carriers, such as C1 and C2 of FIG. 2, may be beneficial as certain subframes, such as subframes #0, #1, #5 and #6, may be associated with DL or may contain DwPTS as for the special subframe 'S' due to legacy restrictions according to which, e.g. subframes #0, #1, #5 and #6 may contain the PSS and SSS. This allows legacy devices to access each carrier independently while giving devices following the above described use of shifted carrier aggregation, as shown in FIG. 2, a constant connectivity in UL and DL.

The above example has been described with respect to the example of the uplink direction transmission but the same may apply when considering downlink transmissions.

Figure 3:
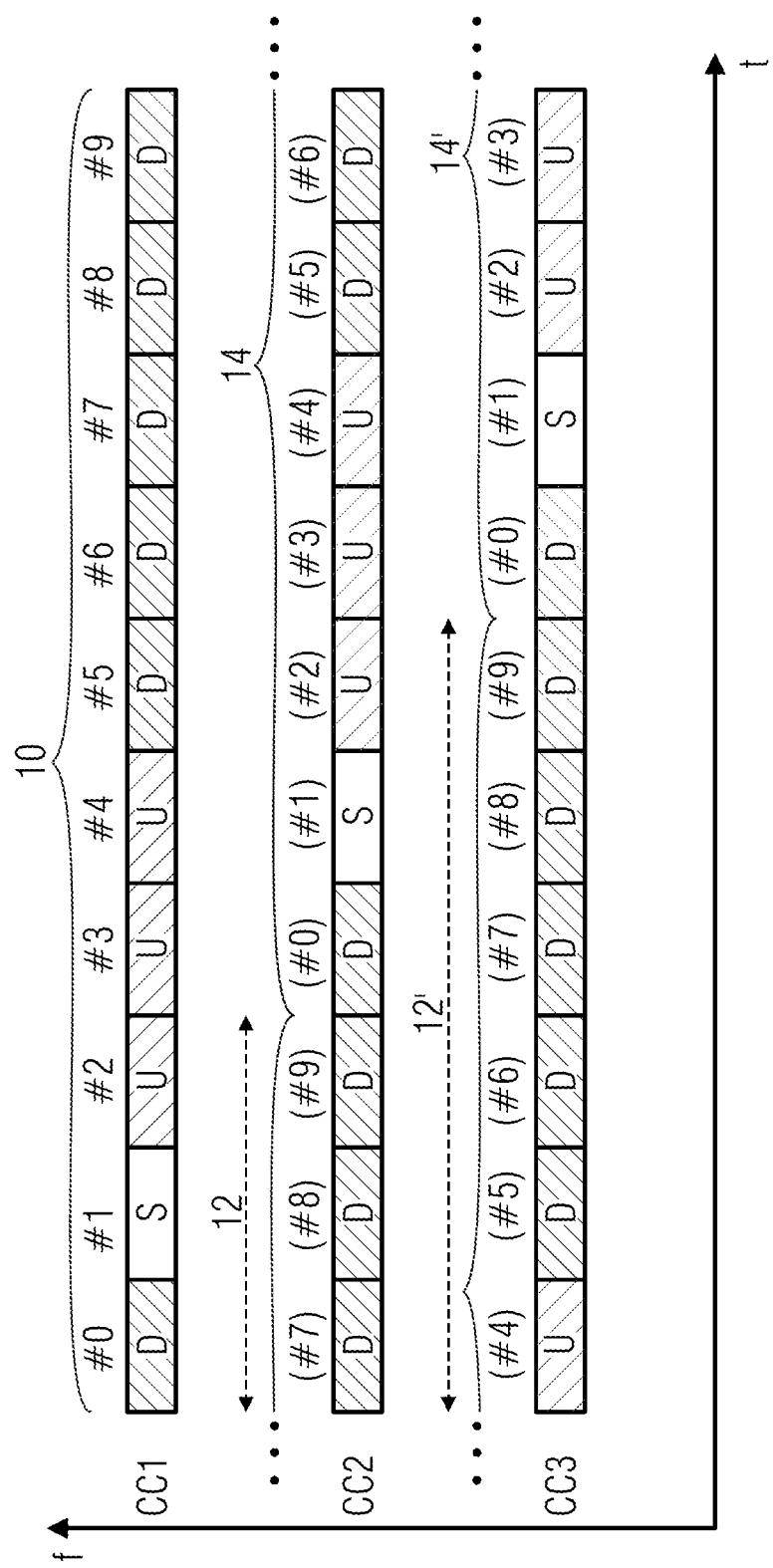
FIG. 3 shows a possibility to configure constant DL and almost constant UL connectivity using three shifted component carriers (CC1, CC2, CC3)

FIG. 3 shows one example of configuring constant DL and almost constant UL connectivity using three shifted component carriers CC1, CC2 and CC3, thereby indicating that the aggregation of two CCs has been presented so far merely as an representative example, and that the number of aggregated carriers may be chosen freely to be greater than one.

The subframe sub-division of the individual component carriers is depicted in FIG. 3 in a manner similar to FIG. 2 but with simplifying the illustration by merely showing the temporal sub-division of the frames into subframes #0 to #9 and omitting any spectral divisioning.

Component carriers CC1, CC2 and CC3 are depicted in FIG. 3 one on top of the other with a temporal axis extending horizontally and a frequency axis extending vertically just as it has been the case in FIG. 2, the axes being registered to each other as far as component carrier CC1 to CC3 is concerned, and the subframes being named by its subframe position within the corresponding frame, i.e. by subframe index #0 to #9.

Subframes #0 to #9 may be associated with at least one of downlink, uplink and special subframes using the 'D', 'U' and 'S' abbreviations as explained above with respect to Table 1.

As can be seen, component carriers CC1 to CC3 of FIG. 3 are all of the same frame configuration which, in the exemplary case of FIG. 3, corresponds to frame configuration number 3 of Table 1.

The temporal shift 12 between component carriers CC2 and CC1 is three subframes long, with the frames of component carrier CC2 being denoted with reference numeral 14. The corresponding temporal shift 12' of component carrier CC3 relative to CC1 is six subframes long with the frames of component carrier CC3 being denoted with reference numeral 14'.

While the example for aggregating time-shifted component carriers may be exploited for TDD carriers of frame configurations used today, it would be possible to define future UE categories which may support shifted CCs to include this concept into LTE such as into LTE advanced.

2.1.2 Distributed Operation for TDD Carrier Aggregation

In the following it will be discussed how to operate small cells with different TDD DL/UL configurations similar to the description in section 2.1.1 above. It is identified which cell is transmitting the anchor carrier, while the other cells are transmitting the other component carrier, which is potentially newly defined as described above.

2.1.2.1 U-Plane and C-Plane Splitting Concept

An U-plane and C-plane splitting concept may be used so as to introduce a level of coordination to organize the data flow for the anchor and component carriers. Two options are available to operate the different component carriers:

- slightly shifted as described in section 2.1.1 but transmitted from different locations, and/or
- both component carriers are operated at the same frequency band and transmitted from different infrastructure locations.

2.1.2.2 Bridging Transitions Between Neighboring Cells

The TDD UL/DL configurations of the selected cells, which might be a macro-, small-, pico- or femto-cell, may be organized such that a seamless handover may be guaranteed while maintaining a continuous DL connectivity.

That is, the concept outlined above, namely the one using time-shifted component carriers, may be used for bridging transitions between neighboring cells. Imagine, for instance, a coverage of a certain area using cells which operate or provide carriers not shifted relative to each other, but secondary or helper cells of potentially smaller coverage are distributed so as to merely cover the edges of the above mentioned primary cells at which the primary cells overlap each other so as to enable a smooth and seamless handover between the primary cells with the secondary cells providing carriers temporarily shifted relative to the primary cells' carriers.

2.1.2.3 Different Carrier Frequencies

The heterogeneous cells may be operated in completely different carrier frequencies such as 1.8 GHz, 2.6 GHz, 28 GHz and 60 GHz. Here, any of the schemes of sections 2.1.2.1 or 2.1.1 may be used.

2.1.2.4 Different Beams Transmitted from the Same Base Station Operated at Different TDD UL-DL Configurations Different TDD UL/DL configurations may also be assigned to different beams transmitted from one, e.g. the same, base station which, in turn, might be a macro-, small- or pico-cell base station.

For example, different beams transmitted from the same base station may be operated at different TDD UL-DL configurations so that a UE served by such a base station may take advantage of aggregating component carriers assigned to different beams. Operating different TDD UL-DL configurations or different beams transmitted from the same base station may be achieved by having a large set of transmit antennas and allowing full-duplex transmission at the base station.

In each of the transmitted beams, either the same band can be used or the carrier aggregation concept described above may be combined such that full DL/UL connectivity can be maintained over different CCs or beams or both. In this case, CQI and PMI feedback from the users for the different beam and CC combinations might be needed.

2.1.2.5 Component Carriers Operating on a Different TTI Basis (e.g. sTTI Vs. TTI)

The above concept of aggregating component carriers of temporally distinct frame configuration or temporally distinct uplink/downlink temporal distribution may be applied to a case where one of the component carriers is operating on sTTI basis whereas the other component carrier is operating on TTI basis. The TTI basis denotes or pertains to the temporal interval at which the communication resources of the individual carriers are assigned to the various user entities which are communicating via these carriers.

This transmission time interval (TTI) is of high importance as new messages to be sent in a downlink or uplink direction need to be announced in specially reserved resources periodically occurring at the TTI and, accordingly, the longer this TTI is the less favorable the respective carrier is for low latency messages. Smaller TTIs such sTTI (short Transmission Time Interval), allow for an earlier announcement of messages.

Accordingly, C-plane splitting may be done for distributed carrier aggregation on sTTI basis. For sTTI, an interface between different eNBs that is fast enough to coordinate resource allocation on sTTI basis may be needed. In particular, a further C-plane splitting in fast and slow C-plane may be introduced.

Figure 4:
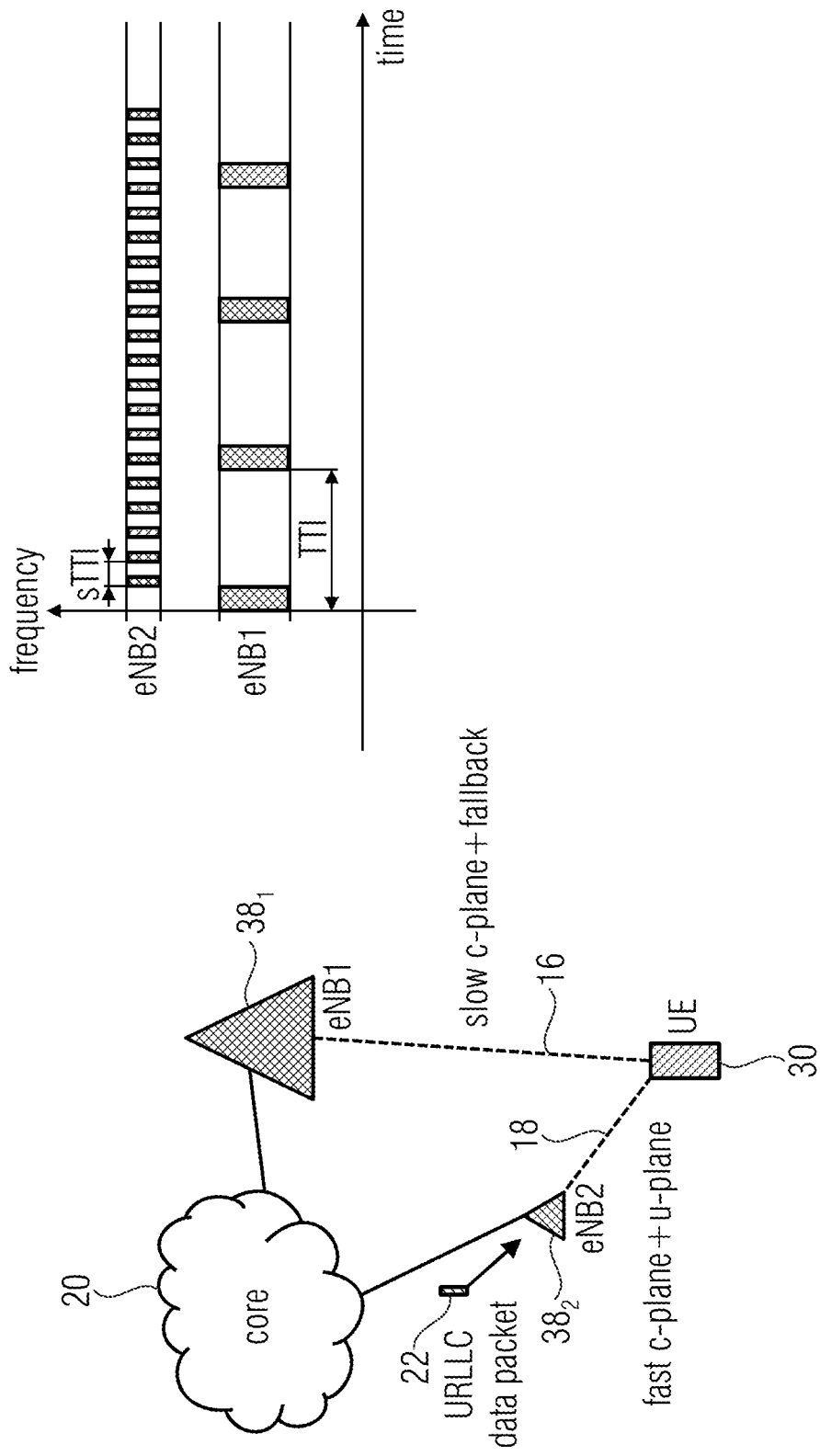
FIG. 4 shows a schematic example of slow and fast c-plane splitting for distributed carrier aggregation.

For example, in FIG. 4 a first eNB $38_1$ or a first base station $38_1$, also depicted as 'eNB1', communicates with a UE 30 via an anchor carrier 16. For instance, the first base station 36 'eNB1' is a macro cell. This anchor carrier 16 carries legacy control plane over slow C-plane on TTI basis.

FIG. 4 depicts the case where anchor carrier 16 is aggregated with another component carrier 18 via which UE 30 is connected with a second eNB $38_2$ or second base station $38_2$, also depicted as eNB2, which might, for instance, be a femto cell.

The active component carrier 18 may carry component carrier control plane on fast C-plane on sTTI basis. This means the following: eNB1 and eNB2 are connected via a core network 20. If a data packet to be transmitted in downlink direction, for instance, such as packet 22, arrives at eNB2, there is no need to announce its transmission to UE 30 via the PDCCH of anchor carrier 16. Rather, it is possible to announce the transmission of packet 22 via component carrier 18 at the next occasion occurring at sTTI basis on the component carrier 18 itself, thereby reducing the data transmission latency.

In other words, it may be favorable to introduce a further C-plane splitting in fast and slow C-Plane. An anchor carrier 16 (e.g. macro cell) on a first eNB1 may carry legacy control plane over slow C-Plane on TTI basis, while an active component carrier 18 on a second eNB2 may carry a component carrier control plane on fast C-Plane on sTTI basis.

2.1.3 Enhancements with Inverted TDD UL/DL Configurations on Aggregated TDD Carriers In the following, embodiments are described where TDD configurations are designed in a way that an uplink frame in one or more carriers may be matched by at least one downlink frame in another carrier. In other words, extra or new TDD UL/DL configurations with complementary or 'inverted' patterns may be introduced in the following.

Figures 5, 6:
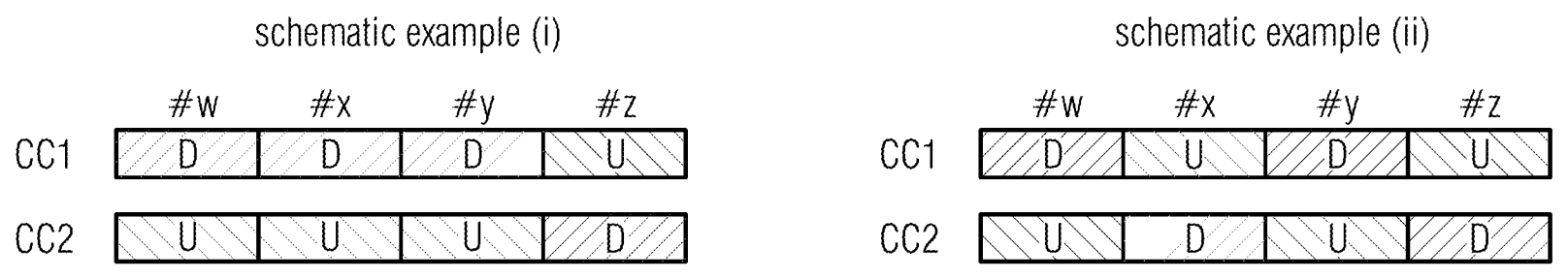

In order to illustrate the concept, it is referred to FIGS. 5 and 6 each showing two aggregated component carriers CC1 and CC2 one on top of the other.

In particular, in case of FIGS. 5 and 6, the framing of both component carriers CC1 and CC2 is the same, i.e. the frames of component carriers CC1 and CC2 are temporally co-aligned. Accordingly, one common subframe indexing is used in FIGS. 5 and 6 for the temporal portion illustrated in these figures. In particular, the temporal portion exemplarily shown in FIGS. 5 and 6 is four subframes wide. The depicted subframes are subframes #w, #x, #y and #z within a current frame.

As can be seen, however, the temporal fraction shown in FIGS. 5 and 6 reveal that the component carrier CC1 and CC2 have their subframes associated to uplink and downlink inverse to each other. That is, while a certain subframe (e.g. #x) of component carrier CC1 is assigned to uplink, the opposite is true for the co-temporal subframe (e.g. #x) of component carrier CC2.

FIGS. 5 and 6 may illustrate the concept of using complementary frame configurations for aggregated component carriers rather in a simplified manner disregarding the existence or necessity for 'S' (Special) subframes. In any case, the two schematic examples of FIGS. 5 and 6 obviously allow for continuous and accelerated UL/DL access by use of two different component carriers CC1 and CC2 with complementary or inverted configurations.

In case of more than two aggregated carriers, the UL/DL ratio to fulfill a given data/service requirement could be adjusted in a flexible way. Two CCs may be sufficient to establish the continuous UL/DL transmission while the other CC(s) leave(s) the option to adjust respective UL and/or DL data rates.

2.1.3.1 TDD UL-DL Configuration Examples with New UL-DL Special Subframe 'SN'

Further TDD UL-DL configuration examples are set out below. They comprise a new UL-DL special subframe which is denoted as 'SN' in the following in order to distinguish such subframes from Uplink subframes 'U', Downlink subframes 'D' and Special subframes 'S', which have been introduced above.

Table 2 shows extended LTE TDD UL-DL configurations. In particular, for each existing UL-DL configuration 0 to 6 as listed in Table 2, a corresponding complementary pattern, denoted with letters A to G, is shown which ensures UL and DL continuity.

Special care may have to be taken to subframes #1 and #6 as they contain the primary synchronization channel P-SCH, i.e. the first OFDM symbols at the beginning of the respective subframe, which need to be transmitted in DL.

Similarly, the secondary synchronization channel S-SCH is located in the last OFDM symbols of subframes #0 and #5, i.e. the end of these subframes may also have to be transmitted in DL.

Figure 7:
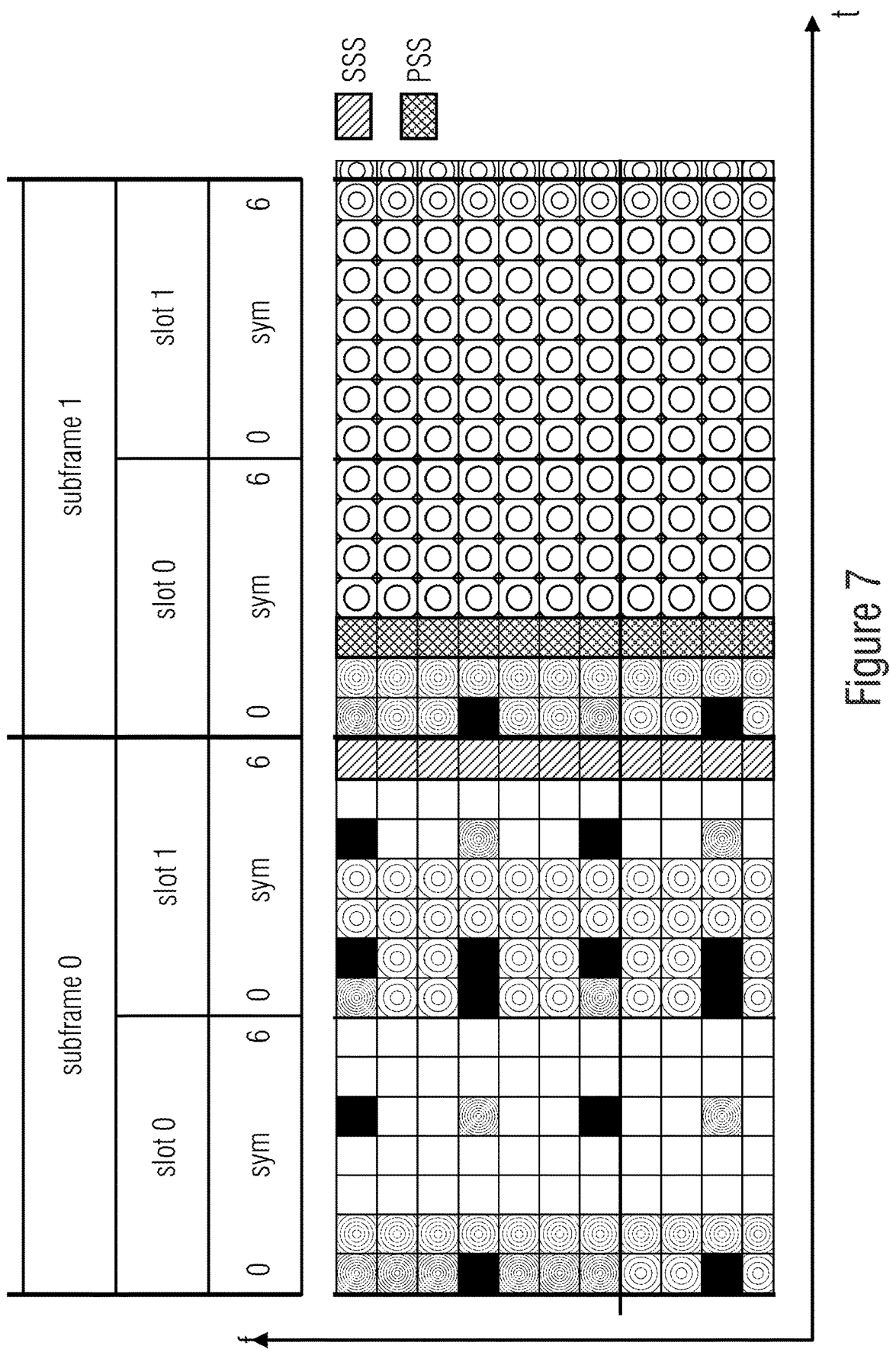
FIG. 7 shows positions of PSS (cross-hatched) and SSS (hatched) in TDD subframes #0 and #1.

In FIG. 7, the spectrotemporal position or location of P-SCH, carrying PSS, and S-SCH, carrying SSS, for subframes #0 and #1 are shown, wherein SSS is depicted in hatched lines and PSS is depicted in cross-hatched lines.

The above mentioned constraint can be solved by using downlink in the considered subframes or, alternatively, by introducing a new UL-DL special subframe 'SN' that can be used in subframes #0 and #5 where just the last symbol, i.e. symbol 6 in slot 1, needs to be downlink, namely for the S-SCH and partial uplink transmission is possible in the first symbols of the subframe, i.e. all symbols of slot 0 and symbols 0 to 5 of slot 1.

TABLE 2

| UL-DL configuration | Downlink-to-Uplink Switch-point periodicity | #0 | #1 | #2 | #3 | #4 | #5 | #6 | #7 | #8 | #9 |
|---|---|---|---|---|---|---|---|---|---|---|---|
| 0 | 5 ms | D | S | U | U | U | D | S | U | U | U |
| A |  | SN | D | D | D | S | SN | D | D | D | S |
| 1 | 5 ms | D | S | U | U | D | D | S | U | U | D |
| A | (best DL complement) | SN | D | D | D | S | SN | D | D | D | S |
| B | (best UL complement) | SN | D | D | S | U | SN | D | D | D | S |
| 2 | 5 ms | D | S | U | D | D | D | S | U | D | D |
| B | (best DL complement) | SN | D | D | S | U | SN | D | D | S | U |
| C | (best UL complement) | SN | D | S | U | U | SN | D | S | U | U |
| 3 | 10 ms | D | S | U | U | U | D | D | D | D | D |
| D |  | SN | D | D | D | S | SN | S | U | U | U |
| 4 | 10 ms | D | S | U | U | D | D | D | D | D | D |
| D | (best DL complement) | SN | D | D | D | S | SN | S | U | U | U |
| E | (best UL complement) | SN | D | D | S | U | SN | S | U | U | U |
| 5 | 10 ms | D | S | U | D | D | D | D | D | D | D |
| E | (best DL complement) | SN | D | D | S | U | SN | S | U | U | U |
| F | (best UL complement) | SN | D | S | U | U | SN | S | U | U | U |
| 6 | 5 ms | D | S | U | U | U | D | S | U | U | D |
| A | (best DL complement) | SN | D | D | D | S | SN | D | D | D | S |
| G | (best UL complement) | SN | D | D | D | S | SN | D | D | S | U |

2.1.4 Interference Mitigation Between Time-Shifted Aggregated TDD Carriers Operating in Neighbor Bands For neighboring aggregated TDD carriers, DL-UL misalignment might lead to interference. In particular, the DL carrier transmits with much higher output power which can lead to a high interference to the UEs transmitting in a neighboring uplink with a much lower transmit power. However, if the operation mode with time-shifted TDD of neighboring frequency bands is configured, several interference mitigation techniques might be used to overcome this interference. Some of these possibilities are set out below.

2.1.4.1 Blanking of Outer Subbands

For example, "outer" radio resources/subbands of the frequency band within the aggregated CC could be blanked. In other words, the scheduler may not allocate resources to the "outer" PRBs (Physical Resource Blocks) in the considered subframes or radioframe.

This could be exploited by using a configuration interface provided for the scheduler, as well as by use of a remote configuration interface between neighboring eNBs or small cells using the X2 interface.

Figure 8:
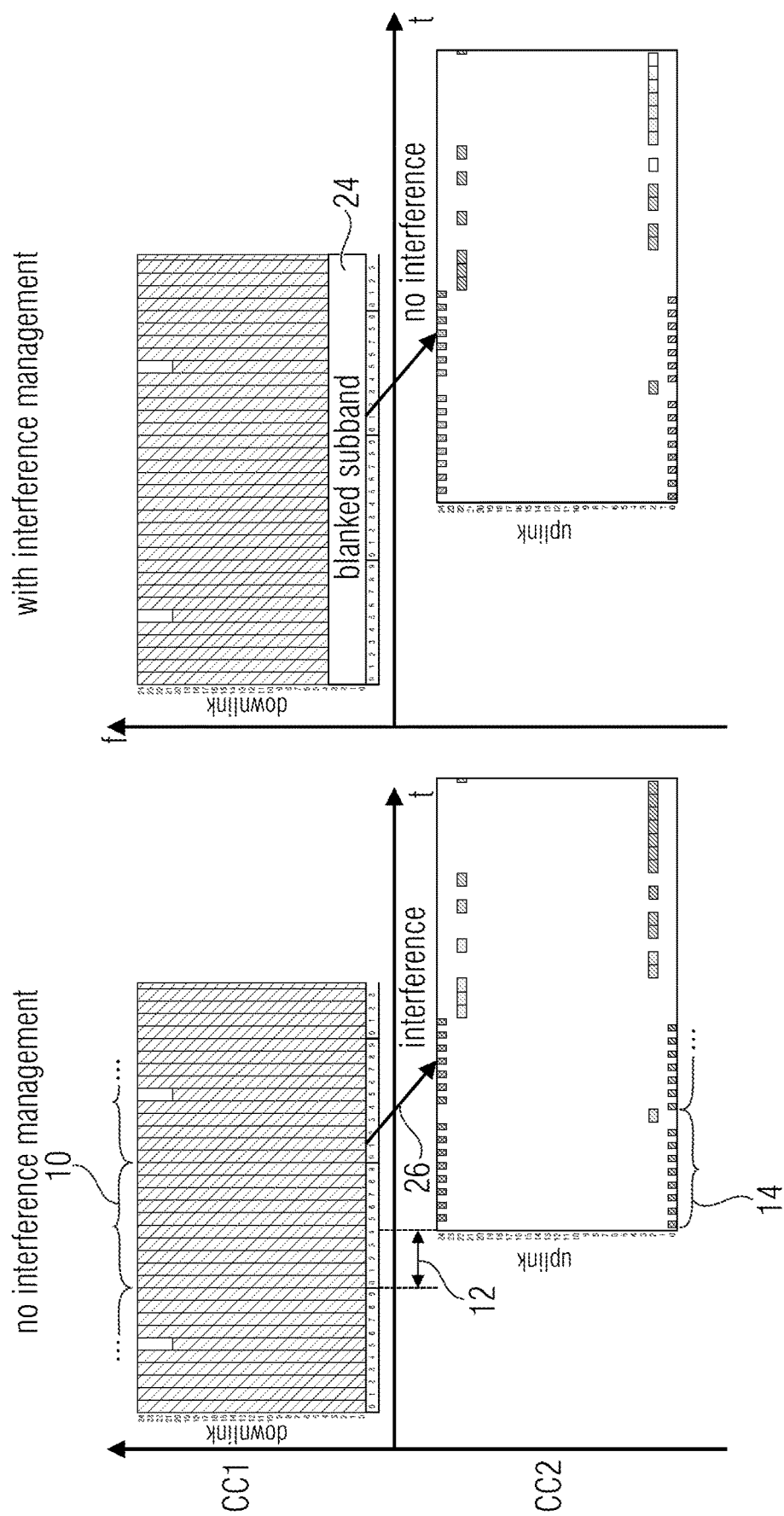
FIG. 8 shows an example where an outer DL subband on CC1 is blanked to avoid interference with the UL on CC2.

FIG. 8 shows an example wherein two aggregated component carriers CC1 and CC2, one on top of the other, using the spectrotemporal illustration previously discussed with reference to FIG. 2 with one common temporal axis $_t$ running horizontally being applicable to both component carriers CC1 and CC2.

The framing of component carriers CC1 and CC2 is time-shifted by temporal shift 12 so that frames 14 of CC2 are time-shifted relative to frames 10 of CC1.

Likewise, one common frequency axis 'f' running vertically is used to relate to both component carrier CC1 and component carrier CC2, thereby illustrating the spectral breadth of both component carriers as well as the spectral juxtaposition of both component carriers wherein CC1 is spectrally adjacent to CC2 at the high frequency side of CC2. That is, CC1 and CC2 spectrally neighbor each other with the lower frequency side of CC1 facing the higher frequency side of CC2. However, this is merely an example and could also be differently, e.g. the other way around.

The left-hand side of FIG. 8 shows the situation where the complete spectral width of CC1, i.e. physical resources or radio resources distributed over the complete spectral width of component carrier CC1, are allocated for respective communications, while the right-hand side illustrates the case where the spectral portion at the spectral end of component carrier CC1 which neighbors or faces component carrier CC2, is blanked, i.e. is excluded from being allocated. This blanked spectral portion is denoted with reference numeral 24.

Accordingly, while physical resources allocated to downlink in the non-blanked case at the left-hand side might lead to interference, denoted by reference numeral 26, of respective uplink transmissions via CC2, such interference does not occur in case of the above outlined interference management where the neighboring PRBs are excluded from resource allocation, i.e. where a particular spectral portion 24 is blanked.

That is, FIG. 8 shows an example where the outer DL subband on CC1 is blanked to avoid interference to the adjacent UL subband on CC2. Blanking of the outer band is just needed at times where UL is active on CC2. Instead of blanking the complete outer subband, it may also be sufficient to blank just certain PRBs.

2.1.4.2 Interference Cancellation Techniques

Simultaneously transmitting and receiving two TDD carriers may lead to interference to the incoming signal. Therefore, interference cancellation techniques might be used to subtract the higher power transmitted signal from the received signal. This might be done in the analogue domain and/or the digital domain.

2.1.5 Further Embodiments

Before proceeding with the description of examples and embodiments of the present invention relating to certain aspects of the present invention, the above description will be briefly summarized by presenting a description of a transceiver using any of the above-described concepts and thoughts in order to gain the advantage also set out above.

Figure 9:
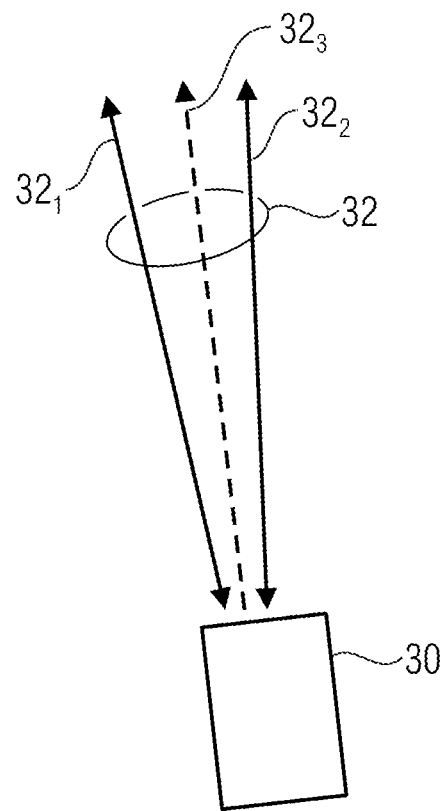
FIG. 9 shows an example of a transceiver according to an embodiment.

FIG. 9 for instance shows a transceiver 30 configured to perform wireless data communication with a third party device (not shown) by aggregating time division duplex (TDD) carriers $32_1$, $32_2$, $32_3$ which have different temporal distribution of uplink times and downlink times.

The time division duplex (TDD) carriers $32_1$, $32_2$, $32_3$ are aggregated into a carrier set 32. The set 32 of aggregated TDD carriers $32_1$, $32_2$, $32_3$ is indicated using reference sign 32 in FIG. 9 while the individual TDD carriers are denoted $32_1$, $32_2$ and so on, in case of more than two component carriers participating in the aggregation.

The transceiver 30 shown in FIG. 9 might be a UE, e.g. a mobile terminal or user entity, using the aggregated set 32 of TDD carriers $32_1$, $32_2$, $32_3$ for communication with a base station (not shown) or base station system (not shown) as the other third party, or transceiver 30 might be a base station or base station system with using the carrier aggregation for communication with a mobile terminal or UE as the other third party device.

As an outcome of the aggregation, transceiver 30 is able to use all aggregated component carriers $32_1$, $32_2$, $32_3$ for uplink and downlink transmissions. As exemplarily shown in FIG. 10, at some point in time $t_0$, transceiver 30 is to transmit something in uplink direction. For this uplink transmission it may use one of the TDD carriers $32_1$, $32_2$ having an uplink phase 34 at that time instant $t_0$ such as TDD carrier $32_2$ in the exemplary case of FIG. 10 while using TDD carrier $32_1$ if a downlink transmission would have to take place at time instant $t_0$ and this TDD carrier $32_1$ would comprise a downlink phase at the time index $t_0$ as illustratively depicted in FIG. 10.

As already described above, the TDD carriers $32_1$, $32_2$, $32_3$ may have different temporal distribution of uplink times and downlink times. This means, as illustrated with respect to FIG. 10, that these TDD carriers $32_1$, $32_2$, $32_3$ may have at least several time instances where at least one TDD carrier has an uplink phase whereas at least another TDD carrier of the set 32 has a downlink phase. Variable $t_0$ in FIG. 10 is such a time instant.

If chosen advantageously, the percentage of time instances where at least one TDD carrier of the set 32 has an uplink phase whereas at least another one of the set 32 has a downlink phase is greater than 50%, more advantageously more than 60% and even more advantageously more than 80%. Variable $t_0$ in FIG. 10 illustrates such a time instant with respect to an example of two carriers $32_1$, $32_2$ depicted in a state one upon the other in a temporally, i.e. horizontally, registered manner, with merely a temporal fraction being shown.

Figure 10:
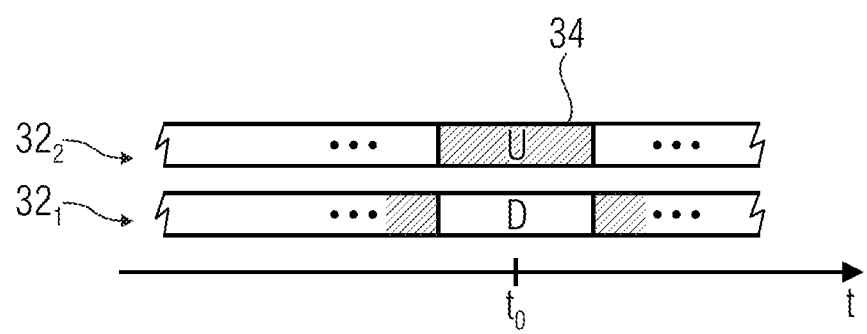
FIG. 10 shows an example of two aggregated inverted carriers according to an embodiment.

The carriers $32_1$, $32_2$ are exemplarily depicted in FIG. 10 as being temporally subframe-aligned which circumstance is, however, not mandatory. One subframe 34 for each carrier is exemplarily shown in FIG. 10 to illustrate this alignment.

As depicted in FIG. 2 and discussed in sections 2.1.1 and 2.1.3, the TDD carriers $32_1$, $32_2$—called C1 and C2 in FIG. 2—may be temporally structured into consecutive frames of a frame length which is equal between the TDD carriers $32_1$, $32_2$, wherein the frames of the TDD carriers $32_1$, $32_2$ may show a temporal alternation between uplink and downlink phases which is equal between the TDD carriers $32_1$, $32_2$.

That is, the frames may be of the same frame configuration. For example, the depicted (FIG. 10) frame of carrier $32_1$ may be subdivided into subframes 34 in the same manner as the depicted frame of carrier $32_2$, with the sequential association of the subframes 34 within frames of carriers $32_1$ and carrier $32_2$ to downlink and uplink subframes being the same, too.

The mutual temporal shift 12 may be an integer multiple of a subframe's 34 length so that the carriers' $32_1$, $32_2$ subframes are temporally aligned even when the frames of the carriers $32_1$, $32_2$ are shifted relative to each other, at least by an integer multiple of the mutual subframe length. In FIG. 11, the temporal shift 12 is denoted as $\Delta t$.

It should be noted that the transceiver 30 depicted in FIG. 9 may be a base station with the third party device to which wireless data communication is instantiated by carriers $32_1$, $32_2$, $32_3$ being a mobile terminal. This possibility is depicted in FIG. 12a using reference sign 36 for illustrating the third party device as a rectangle which, in turn may represent a mobile device.

The transceiver 30 is here configured to configure the TDD carriers $32_1$, $32_2$, $32_3$ and send configuration signals for correspondingly configuring the TDD carriers $32_1$, $32_2$, $32_3$ on the side of the third party device 36, to the third party device 36 via at least one of the TDD carriers $32_1$, $32_2$, $32_3$.

Figure 12A:
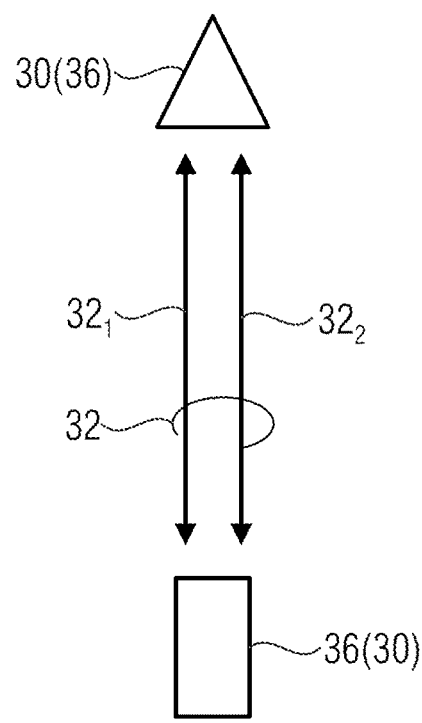
FIG. 12a shows an example of bidirectional communication by means of aggregated carriers according to an embodiment.

Merely two carriers $32_1$ and carrier $32_2$ are depicted in FIG. 12a for illustration purposes, but naturally, more than two may be present. This statement shall now be understood as pertaining to all the embodiments specifically discussing the coexistence of two aggregated carriers without explicit repetition.

Figure 12B:
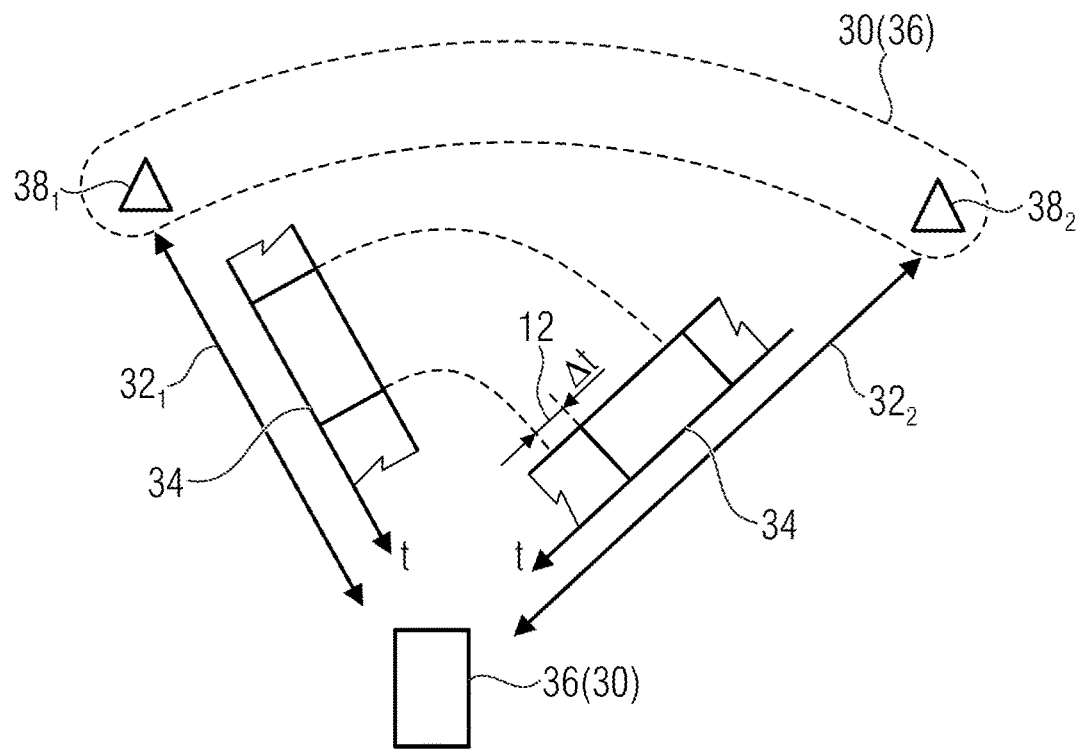
FIG. 12b shows an example of bidirectional communication with a base station system comprising two base stations by means of aggregated carriers according to an embodiment.

FIG. 12b shows a further example according to which the transceiver 30 of FIG. 9 may be a system comprising at least two base stations $38_1$, $38_2$ (triangles) connected via a backhaul network not further shown in FIG. 12b, wherein the third party device 36 may be a mobile terminal.

The transceiver 30 of this embodiment may be configured to communicate with the third party device 36 via a first TDD carrier $32_1$ at a first base station $38_1$ and via a second TDD carrier $32_2$ at a second base station $38_2$. The transceiver 30 configures the first and second TDD carriers $32_1$, $32_2$ and sends configuration signals for correspondingly configuring the first and second TDD carriers $32_1$, $32_2$ at the third party device 36, to the third party device 36 via at least one of the TDD carriers $32_1$, $32_2$.

The TDD carriers $32_1$, $32_2$ may be aggregated as explained further above. Accordingly, from a base stations point of view, embodiments provide for a base station system 30 comprising a first base station $38_1$ and a second base station $38_2$. The base station system 30 of this embodiment is configured to perform wireless communication with a mobile terminal 36 (e.g. an UE) by aggregating a first carrier $32_1$ at the first base station $38_1$ and a second carrier $32_2$ at the second base station $38_2$.

The inventive base station system 30 of this embodiment is further configured to configure the first and second carriers $32_1$, $32_2$. The base station system 30 may do so by sending first configuration signals for correspondingly configuring the first and second carriers $32_1$, $32_2$ at the mobile terminal 36, to the mobile terminal 36 via the first carrier $32_1$, and by sending second configuration signals for correspondingly configuring the second carrier $32_2$ at the mobile terminal 36, to the mobile terminal 36 via the second carrier $32_2$. Additionally or alternatively, the base station system 30 may do so by sending first configuration signals for correspondingly configuring the first and second carriers $32_1$, $32_2$ at the mobile terminal 36, to the mobile terminal 36 via the second carrier $32_2$, and by sending second configuration signals for correspondingly configuring the second carrier $32_2$ at the mobile terminal 36, to the mobile terminal 36 via the first carrier $32_1$. Stated in more general terms, the base station system 30 of this embodiment may be configured to transmit first configuration signals to the mobile terminal via at least one of the component carriers $32_1$, $32_2$.

Furthermore, the base station system 30 of this embodiment is configured to send the first configuration signals to the mobile terminal 36 less frequently than the second configuration signals. In other words, the first base station $38_1$ uses a slow C-Plane, while the second base station $38_2$ uses a fast C-Plane. Stated in yet other words, the first carrier $32_1$ of the first base station $38_1$ comprises longer TTIs than the second carrier $32_2$ of the second base station $38_2$. For further details as to the aforementioned C-Planes it is referred to FIG. 4.

Stated from a UEs point of view, embodiments of the invention provide for a mobile terminal 36 configured to perform wireless communication with a base station system 30 comprising a first base station $38_1$ and a second base station $38_2$ by aggregating a first component carrier $32_1$ at the first base station $38_1$ and a second component carrier $32_2$ at the second base station $38_2$.

The mobile terminal 36 of this embodiment is further configured to receive first configuration signals from the base station system 30 via at least one of the component carriers $32_1$, $32_2$. It may further be configured to receive second configuration signals from the base station system 30 via at least the first and/or the second component carrier $32_2$.

The mobile terminal 36 may further be configured to configure the first and second component carriers $32_1$, $32_2$ depending on the first and second configuration signals received by at least one of the first and second component carriers $32_1$, $32_2$.

Furthermore, the mobile terminal 36 of this embodiment may be configured to derive the first configuration signals from the first component carrier $32_1$ less frequently than the second configuration signals from the second component carrier $32_2$. In other words, the channel between the mobile terminal 36 and the first base station $38_1$ uses a slow C-Plane, while the channel between the mobile terminal and the second base station $38_2$ uses a fast C-Plane.

According to yet a further embodiment, at least one of the at least two base stations $38_1$, $38_2$ depicted in FIG. 12b may be configured to communicate with the third party device (e.g. UE, mobile terminal, etc.) 36, or even with another third party device (not depicted), over a further TDD carrier (e.g. TDD carrier $32_3$ exemplarily depicted in FIG. 9). The further TDD carrier $32_3$ may be located within a frequency band spectrally adjacent to a frequency band of the first TDD carrier 311 and/or adjacent to a frequency band of the second TDD carrier $32_2$. Furthermore, the temporal distribution of uplink times and downlink times of said further TDD carrier $32_3$ may vary from the temporal distribution of the first TDD carrier $32_1$ and/or of the second TDD carrier $32_2$. As described with reference to FIG. 8, the transceiver of this example may be configured to blank subcarriers at a frequency subband 24 at an end of the respective frequency band of the above mentioned further TDD carrier $32_3$ and/or of the first TDD carrier $32_1$ and/or of the second TDD carrier $32_2$.

According to yet a further embodiment, and as discussed with reference to FIG. 4, the transceiver 30 may send the aforementioned first configuration signals for correspondingly configuring both the first and second TDD carriers $32_1$, $32_2$ at the third party device 36, to the third party device 36 via the first TDD carrier $32_1$, while sending second configuration signals merely for correspondingly configuring the second TDD carrier $32_2$ at the third party device 36, to the third party device 36 via the second TDD carrier $32_2$, wherein the first configuration signals might be sent to the third party device 36 less frequently, for example on TTI basis, than the second configuration signals which may be sent on an sTTI basis.

The configuration may pertain to the scheduling of uplink and/or downlink transmissions on the carriers $32_1$, $32_2$, respectively.

In FIGS. 12a and 12b the third party devices may themselves be transceivers of the type shown in FIG. 9, i.e. they may be the transceiver 30, with the entity 36 in FIGS. 12a and 12b assuming the role of the third party device 36, with this being illustrated by the assignment of reference numbers in parentheses.

Thus, FIG. 12a shows that the transceiver 30 of FIG. 9 may be the mobile terminal, whereas the third party device 36 is a base station and the transceiver 30 is configured to receive configuration signals from the third party device 36 via at least one of the TDD carriers $32_1$, $32_2$ and configure the TDD carriers $32_1$, $32_2$ on this side depending on the configuration signals.

FIG. 12b illustrates that the transceiver 30 of FIG. 9 may be a mobile terminal, with the third party device 36 being a system comprising at least two base stations $38_1$, $38_2$ and a backhaul network not shown in FIG. 12b, wherein the transceiver 30 is configured to communicate with the system 36 via the first TDD carrier $32_1$ at the first base station $38_1$ and via a second TDD carrier $32_2$ at a second base station $38_1$, wherein the transceiver 30 is configured to receive first configuration signals from the system 36 via at least one of the TDD carriers $32_1$, $32_2$ and configure the first and second TDD carriers $32_1$, $32_2$ depending on the configuration signals.

As described, first configuration signals sent via, e.g. the first TDD carrier $32_1$ for configuring both carriers $32_1$, $32_2$ may be sent less frequently than second configuration signals sent via the second TDD carrier $32_2$ for configuring carrier $32_2$ specifically.

In both of the embodiments of the transceivers as depicted in FIG. 12a and FIG. 12b, the first and the second TDD carriers $32_1$, $32_2$ may share the same frequency band.

Furthermore, the configuration signals that have been exemplarily described with reference to FIG. 12a and FIG. 12b may comprise, e.g. an user allocation signal for allocating spectrotemporal segments of the TDD carriers $32_1$, $32_2$ to different users, for example to different UEs. Additionally or alternatively, said configuration signals may comprise a frame setting signal for indicating a temporal distribution of uplink times and downlink times within one or more upcoming frames of the TDD carriers $32_1$, $32_2$.

It may be possible that the transceiver 30 allows for, and may accordingly perform, a switching between different frame configurations at transitions between immediately consecutive frames 34 of the TDD carriers $32_1$, $32_2$ so that the temporally overlapping frames 34 of the TDD carriers $32_1$, $32_2$ are of the equal frame configuration, wherein the different frame configurations differ in temporal alternation between uplink and downlink phases.

For example, at some point in time, the frame configuration which the frames 34 of TDD carriers $32_1$, $32_2$ are composed of, is changed from one configuration of Table 1 to another of Table 1 although the selection from Table 1 is merely an example.

It could be, however, that such switching is allowed merely in the framework of some reconfiguration or rebooting process of the whole cellular network or system including base station 38.

In other words, transceiver 30 may support different frame configurations out of which the frames 34 of the first TDD carrier $32_1$ and the frames 34 of the second TDD carrier $32_2$ are selected so that frames 34 of the first TDD carrier $32_1$ are of a first frame configuration and the frames 34 of the second TDD carrier $32_2$ are of a second frame configuration, namely with the first and second frame configuration being equal to each other according to the example of FIG. 2. Then, the transceiver 30 may be configured to adapt the amount at which the frames 34 of the first and the second carriers $32_1$, $32_2$ are temporally shifted to each other depending on the selection of the first and second frame configurations out of the different frame configurations.

In other words, Δt may depend on, or vary depending on, the frame configuration chosen for frames 34. In FIG. 2, Δt was two subframes long for configuration number 1 of Table 1, but it could be different for another configuration of Table 1, for instance, such as three subframe lengths for configuration number 3.

Figure 12C:
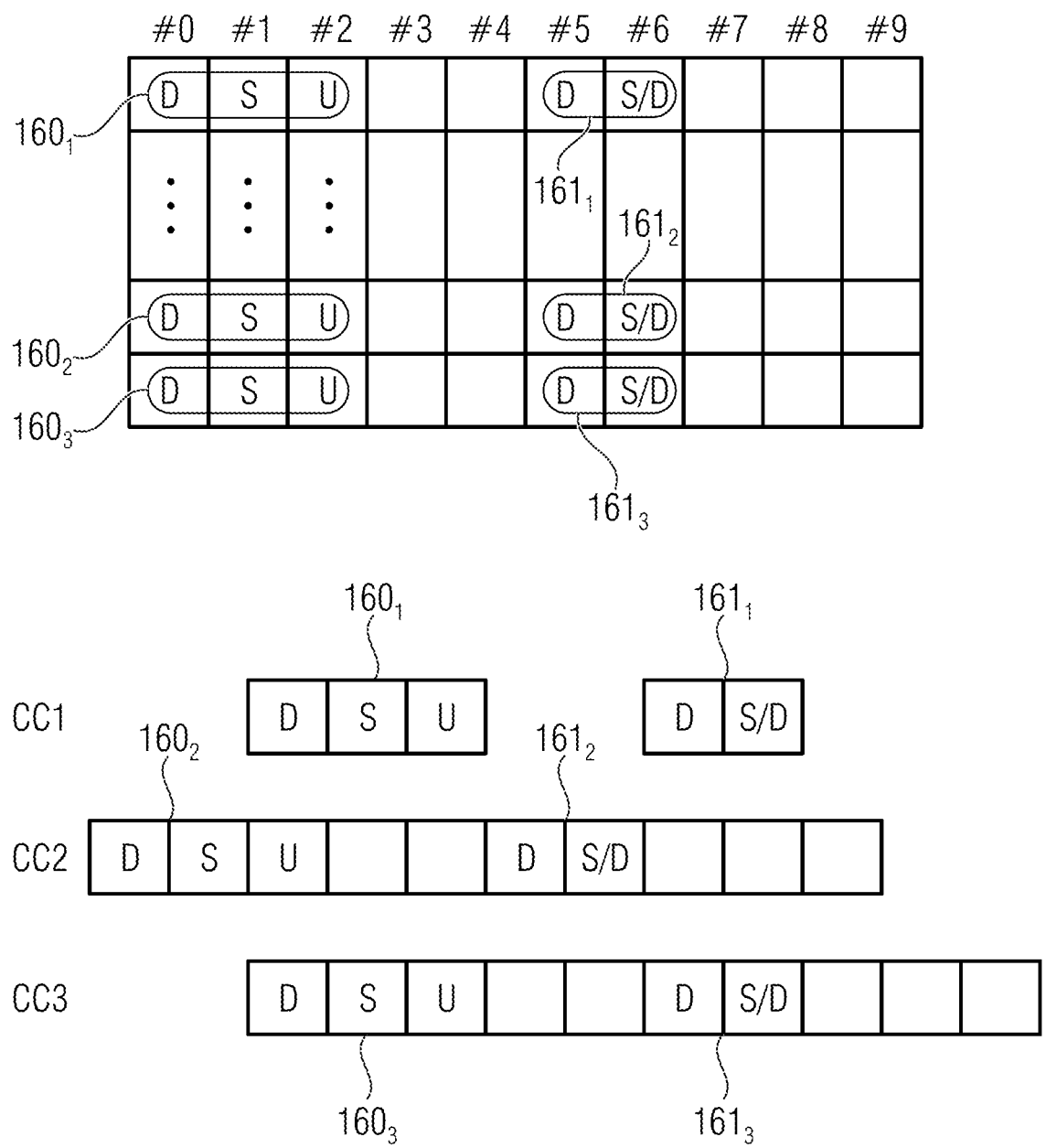
FIG. 12c shows an example of shifting of frame segments according to an embodiment.

For further explanation of further embodiments, reference shall again be made to Table 1 in combination with FIG. 12c.

As explained further above, Table 1 exemplarily shows seven different UL-DL configurations 0 to 6. These different UL-DL configurations 0 to 6 may also be referred to as a group of frame configurations. FIG. 12c shows a less detailed version of Table 1.

Some configurations of the group may comprise the same patterns of uplink and/or downlink and/or special resources which may be contiguous and temporally collocated. For example, the subframes #0, #1 and #2 may comprise 'D', 'S', 'U' in each of the seven configurations within the group. These contiguous and temporally collocated number of subframes may also be referred to as a frame segment $160_1$, $160_2$, $160_3$.

The same applies, for instance, for subframes #5 and #6. With reference to Table 1, subframe #5 uses 'D', while subframe #6 either uses 'S' or Accordingly, as depicted in FIG. 12c, the configurations may also comprise a second frame segment $161_1$, $161_2$, $161_3$ having an equal scheduling of uplink and/or downlink and/or special resources.

Embodiments of the present invention may therefore provide for a transceiver, wherein the different frame configurations, between which the transceiver switches, form a group of frame configurations. At least a majority of these frame configurations of said group provides, in one or more contiguous and—relative to the frame borders—temporally collocated frame segments $160_1$, $160_2$, $160_3$, $161_1$, $161_2$, $161_3$, an equal scheduling of uplink and/or downlink.

As mentioned above, the transceiver may switch between these different frame configurations. As exemplarily depicted in FIG. 12c, the frames of the first and second TDD carriers CC1 and CC2 are temporally mutually shifted by a time amount corresponding to a temporal length of the one or more contiguous and—relative to the frame borders—temporally collocated frame segments $161_1$, $161_2$. In the example shown in FIG. 12c, the carriers CC1 and CC2 are shifted by a time amount corresponding to the temporal length of the second frame segment $161_1$, $161_2$ comprising subframes #5 and #6, i.e. by a time amount corresponding to the two subframes #5 and #6.

According to yet a further embodiment, the different frame configurations between which the transceiver switches form a group of frame configurations equally subdivided into a sequence of subframes #0 to #6, each subframe #0 to #6 being associated with at least one of an uplink mode 'U', a downlink mode 'D' and a special mode 'S', as mentioned above.

The special mode 'S' corresponds to a predetermined below-subframe temporal distribution of uplink 'U' and downlink 'D'. In other words, the special mode 'S' may comprise subdivisions of a size smaller than a subframe-size, said subdivisions being exemplarily depicted in FIG. 1 denoted with DwPTS', 'GP' and 'UpPTS'.

At least a majority of the group of frame configurations differs in association of the subframes to the uplink mode 'U', the downlink mode 'D' and the special mode 'S' with having one or more contiguous and—relative to the frame borders—temporally collocated frame segments $160_1$, $160_2$, $160_3$, $161_1$, $161_2$, $161_3$ within which the subframes' association to the uplink mode 'U', the downlink mode 'D' and the special mode 'S' being such that there is no—with respect to the frame borders—temporally collocated pair of subframes in the one or more contiguous and—relative to the frame borders—temporally collocated frame segments $160_1$, $160_2$, $160_3$, $161_1$, $161_2$, $161_3$, of which one part of the pair is associated with uplink mode while the other part of the pair is associated with the downlink mode 'D'. In other words, and with reference to Table 1, there is no subframe using downlink mode 'D' which is directly followed by a subframe using uplink mode 'U'.

As exemplarily depicted in FIG. 3, according to a first option of this embodiment, the frames of the first and second TDD carriers CC1, CC2 (and optionally a third carrier CC3) are mutually shifted by n times a subframe length with n corresponding to the number of subframes the one or more contiguous and—relative to the frame borders—temporally collocated frame segment is long. In this example, the first frame segment $160_1$, $160_2$, $160_3$ comprising subframes #0, #1 and #2 is three subframes long. Accordingly, the temporal time shift is also three subframes long.

Still with reference to FIG. 3, for example, it can be seen that the frames of the first and second TDD carriers CC1 and CC2 may be temporally mutually shifted by a time amount corresponding to a temporal length of the above mentioned first frame segment $160_1$, $160_2$, $160_3$ comprising subframes #0, #1 and #2. According to this example, the first frame segment comprising subframes #0, #1 and #2, i.e. 'D', 'S' and 'U' is considered. As can be seen, the frame segment #0, #1, #2 of the second component carrier CC2 is shifted relative to the frame segment #0, #1, #2 of the first component carrier CC1. Furthermore, the frame segment #0, #1, #2 of the third component carrier CC3 is shifted relative to the frame segment #0, #1, #2 of the second component carrier CC2. In other words, the temporal shift equals the number of subframes contained within a frame segment 160, 161.

As exemplarily depicted in FIG. 12c, and according to a second option of this embodiment, the frames of the first and second TDD carriers CC1, CC2 (and optionally a third carrier CC3) are mutually shifted by n times a subframe length with n corresponding to the minimum number of subframes which when mutually temporally shifting two instantiations of the one or more contiguous and—relative to the frame boarders—temporally collocated frame segments $160_1$, $160_2$, $160_3$, $161_1$, $161_2$, $161_3$ of any of the group of frame configurations, results in an absence of any pair of subframe within a first instantiation and—after temporal shift—temporally collocated subframe within the second instantiation among which both are of the uplink mode, or both of the downlink mode.

In other words, in case of the first frame segment $160_1$, $160_2$, $160_3$ containing subframes #0, #1, #2 and/or the second frame segment $161_1$, $161_2$, $161_3$ comprising subframes #5 and #6, each of Table 1's configurations may be shifted by two subframes, so that the first and second frame segments do not overlap.

As previously discussed above in section 2.1.4.1 with respect to FIG. 8, transceiver 30 may be a base station which blanks subcarriers at an edge of a frequency band of one or more neighbor carriers being spectrally adjacent to at least one of the TDD carriers $32_1$, $32_2$, $32_3$ belonging to the aggregated carrier set 32, wherein the neighbor carrier may be another TDD carrier of set 32 or another carrier via which the base station communicates with one or more further third party devices.

In FIG. 8, the blanking took place with respect to CC1 at the edge close to CC2, with CC1 and CC2 belonging to one set of frames 14. Alternatively, the first and second TDD carriers $32_1$ and $32_2$ may share the same frequency band as discussed in section 2.1.2.1, first alternative, or on different frequency bands as described in section 2.1.1 or section 2.1.2.3.

As described in section 2.1.2.3, the first and second TDD carriers $32_1$ and $32_2$ may be on frequency bands separated from each other by more than 5 GHz. Even alternatively or additionally, in case of the transceiver 30 being a system composed of one or more base stations 281, 282 as discussed above with respect to FIG. 12b, at least one of the first and second base stations 281, 282 may communicate via the TDD carrier spectrally neighboring the blanked carrier with the third party device, wherein this base station 281, 282 spatially confines its downlink transmissions over this TDD carrier onto a spatial beam.

The system transceiver 30 may communicate with another third party device over a further carrier, which may also be a TDD carrier, in a manner spatially confining this communication to a further spatial beam, the further carrier differing in temporal distribution of uplink times and downlink times from the former TDD carrier. This has been discussed in section 2.1.2.4. The two mentioned beam focused carriers may share the same frequency band.

As explained above with reference to FIGS. 5 and 6 and Table 2, examples of the present invention provide for inverted frame configurations.

For example, as can be seen in Table 2, a first frame configuration 0 may comprise subframes #0 to #9, each having a certain distribution of uplink mode 'U', downlink mode 'D' and special mode 'S'.

A complementary frame configuration may be provided by means of depicted frame configuration A. As can be seen, for each subframe of configuration 0 which contains 'U', a complementary subframe containing 'D' or 'S' is provided in configuration A. Accordingly, the complement of uplink mode 'U' is either a subframe of downlink mode 'D' or special mode 'S'.

For each subframe of configuration 0 which contains 'D', a complementary subframe containing 'U' or 'SN' is provided in configuration A. Accordingly, the complement of downlink mode 'D' is either a subframe of uplink mode 'D' or new special mode 'SN'.

However, the complement of special mode 'S' is downlink mode D'.

Thus, embodiments provide for a transceiver, wherein the TDD carriers are temporally structured into consecutive frames of a frame length which is equal between the TDD carriers, wherein temporally overlapping frames of the TDD carriers are temporally registered to each other to temporally coincide, wherein the transceiver is configured to switch between different frame configurations at transitions between immediately consecutive frames of the TDD carriers ($32_1$, $32_2$, $32_3$), wherein the different frame configurations between which the transceiver (30) switches, form a group of frame configurations equally subdivided into a sequence of subframes, e.g. subframes #0 to #9 in Table 2.

Each subframe #0 to #9 is associated with one of an uplink mode 'U', a downlink mode 'D' and one or more special modes 'S' or 'SN', the one or more special modes 'S' or 'SN' correspond to a predetermined below-subframe temporal distribution of uplink 'U' and downlink 'D' (see FIG. 1).

As shown in Table 2, the group of frame configurations comprises a first subset of frame configurations, e.g. frame configuration 0 and a second subset of frame configurations, e.g. frame configuration A. The first and second subsets each differ in distribution of, and frequency of, subframes #0 to #9 associated with the uplink 'U' and downlink 'D' modes, The second subset of frame configurations, e.g. frame configuration A, comprises at least one inverted frame configuration for each frame configuration of the first subset, as explained above.

For example, with reference to Table 2, a first subset of frame configurations may comprise one or more frame configurations of the frame configurations 0 to 6 highlighted in bold lines. The second subset of frame configurations may comprise one or more frame configurations of the frame configurations A to G. Accordingly, for a frame configuration of the first subset, e.g. frame configuration 1, there may be provided an inverted complementary frame configuration A representing the best DL complement, and an inverted complementary frame configuration B representing the best US complement.

However, as mentioned above with reference to Table 1, in any of the frame configurations a 'D' may not be followed by a 'U'. In other words, in this embodiment, there may be no—with respect to the frame boarders—temporally collocated pair of subframes in the respective frame configuration of the first subset and the at least one frame configuration of the second subset, of which one is associated with uplink mode while the other of the pair is associated with the downlink mode.

In each of the embodiments described herein, the aggregated TDD carriers $32_1$, $32_2$, $32_3$ are selected so that a percentage of times an uplink is available to the transceiver (30) on the aggregated TDD carriers $32_1$, $32_2$, $32_3$ and/or a percentage of times a downlink is available to the transceiver 30 on the aggregated TDD carriers $32_1$, $32_2$, $32_3$, is increased relative to each of the TDD carriers $32_1$, $32_2$, $32_3$ individually.

2.2 Accelerated UL and/or DL Access Through Time-Offsets within TTI Length for Aggregated Carriers (FDD/TDD-Independent)

A further advantage of the invention shall be described with reference to FIG. 13 which shows, as an example, three component carriers (CCs) positioned one atop of the other. In the diagram depicted in FIG. 13, a vertical axis represents a frequency while a horizontal axis represents a time.

Figure 13:
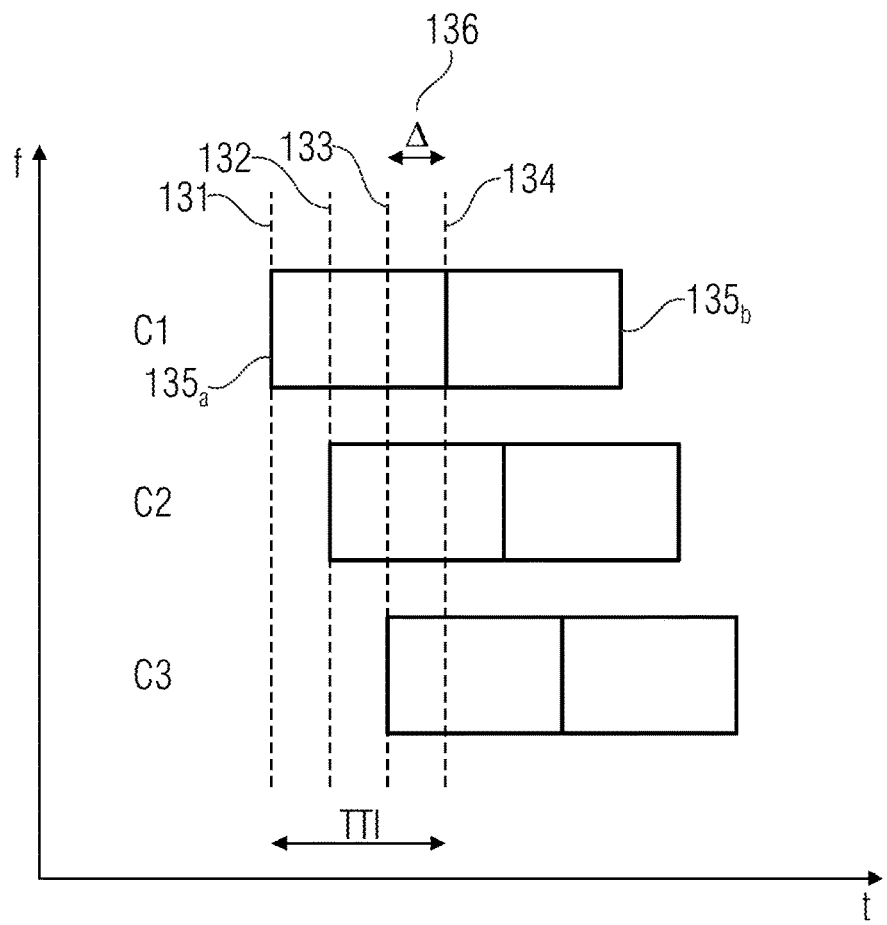
FIG. 13 shows an example of Sub-TTI shifted carriers for access time reduction according to an embodiment.

In particular, FIG. 13 shows a first component carrier C1 starting at a first point in time, denoted with reference numeral 131. A second component carrier C2 starts at a second point in time, denoted with reference numeral 132. The second point in time 132 is later than the first point in time 131. Accordingly, the first component carrier C1 and the second component carrier C2 are temporally shifted relative to each other.

FIG. 13 exemplarily also shows a third component carrier C3 starting at a third point in time, denoted with reference numeral 133. The third point in time 133 is later than the first point in time 131 and later than the second point in time 132. Accordingly, the third component carrier C3 is temporally shifted relative to the first component carrier C1 and relative to the second component carrier C2.

As exemplarily depicted in FIG. 13, the first component carrier C1 comprises two Transmission Time Intervals TTI $135_a$ and $135_b$ each of which could, for instance, be a subframe comprising a downlink resource 'D', an Uplink resource 'U', a special resource 'S' or a new special resource 'SN'. As can be seen, the first TTI $135_a$ ends at a fourth point in time 134, while the second TTI $135_b$ starts at said fourth point in time 134. This time interval between the first point in time 131 and the fourth point in time 134 is also referred to as the Transmission Time Interval (TTI).

In other words, each of the subcarriers C1, C2, C3 may comprise an individual TTI, wherein each of these individual TTIs are shifted by a certain amount of time and thus mutually offset relative to each other. As can be seen in FIG. 13, the individual but shifted TTIs may form a kind of temporal grid.

Accordingly, embodiments of the invention may provide for an apparatus configured to perform data transmission or reception via allocations of transmission or reception resources of aggregated carriers C1, C2, C3 in units of transmission time intervals (TTI) into which the aggregated carriers C1, C2, C3 are subdivided, wherein the aggregated carriers C1, C2, C3 are temporally subdivided into the transmission time intervals in a temporal grid, respectively, wherein the aggregated carriers' grids are temporally mutually offset.

The fourth point in time 134 is temporally shifted relative to the first, the second and the third points in time 131, 132, 133. In the example shown in FIG. 13, the above described points in time are equally shifted or distanced from each other. That is, each point in time 131, 132, 133, 134 is distanced by the same amount Δt, denoted with reference numeral 136. However, according to alternative embodiments, the above described points in time may be unequally shifted or distanced from each other. That is, two or more points in time 131, 132, 133, 134 may be distanced relative to each other (i.e. one relative to the subsequent one) by different amounts of time intervals $Δt_x$.

According to the above described embodiments, a shift within the transmission time interval (TTI) length is introduced. For a number of N component carriers with equal TTI length a shift of Δc=(1/N)*TTI equidistant over time could be seen as optimal, as shown exemplarily in FIG. 13. Here, component carrier C1 is based on time instance C1(t) followed by C2(t+ΔT) and C3(t+2*ΔT) for constant shifts.

According to this embodiment, the aggregated carriers' grids are temporally mutually offset at an amount Δc being a non-integer multiple of the transmission time intervals TTI.

According to yet a further embodiment, the non-integer multiple Δc is smaller than one, i.e. a fraction of one.

However, as explained above, embodiments also cover the case where C1(t) would be followed by C2(t+ΔT1) and C3(t+ΔT2) and ΔT1 and ΔT2 would denote non-constant shifts.

An example for the basis of shifting aggregated CCs within TTI could be (but is not limited to) multiples of OFDM symbols in order to be synchronous on a symbol structure.

The benefit of this aspect of the invention is a reduction of the access cycle, i.e. the time-to-wait for the next transmission, in UL and/or DL. This aspect may well be combined with each of the above mentioned examples as described under section 2.1 to allow better continuity in UL-DL transmission on shifted carriers, e.g. improvements for UL/DL overlaps in special subframes in FIG. 2, for example.

2.2.1 Externally Triggered Clock for Base Station

Figure 14:
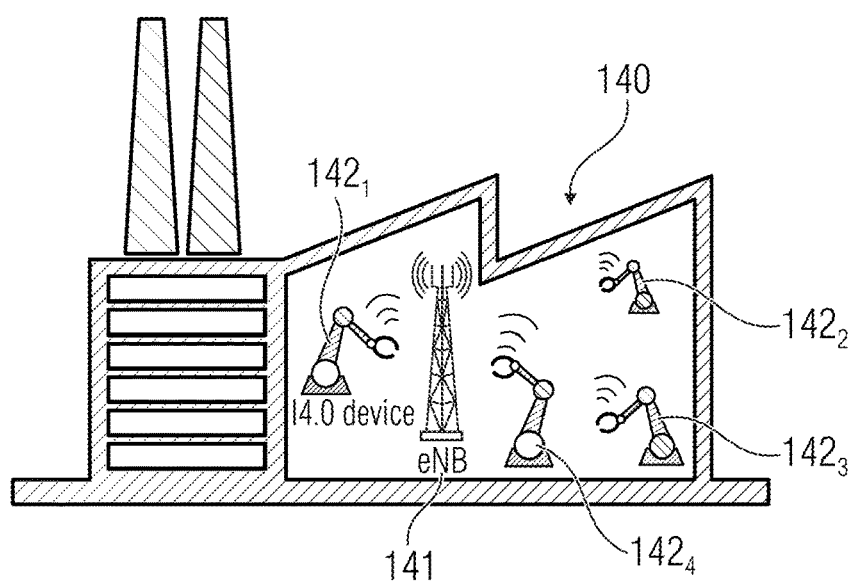
FIG. 14 shows an example of wireless communication in industry 4.0.

FIG. 14 shows a further embodiment of the present invention. There exist wireless systems 140 which need to operate on a well-defined time cycle for periodic transmission. By default these cycles may not match with the base station's (e.g. eNB) 141 configuration or the current (s)TTI basis.

For example, in the context of 'Industry 4.0 (I4.0)' the field devices $142_1$, $142_2$, $142_3$, $142_4$ used in wireless industrial automation strictly need data to be present in precise moments which occur periodically on a cycle basis and is often triggered by specific external BUS systems. Usually several or all I4.0 devices $142_1$, $142_2$, $142_3$, $142_4$ within one process environment 140 need to have the respective data present at these points in time.

The following embodiments are configured to adjust the clock of (non-anchor) component carrier of a base station 141 to an external entity, e.g. I4.0 device $142_1$, $142_2$, $142_3$, $142_4$.

The reconfiguring of the clock basis of a (set of) carrier(s) enables an external entity (e.g. I4.0 device $142_1$, $142_2$, $142_3$, $142_4$) or a complete system 140 to directly align the transmission to their application, having a maximal latency reduction on the access-cycle.

2.2.1.1 Adjust Clock of Base Station by Time Offset

Embodiments of the invention are configured to adjust the clock of a base station by a time offset through signaling on a physical channel like the PRACH in 3GPP LTE. In particular, the clock of a (non-anchor) component carrier (CC) of the eNB can be adjusted by a time offset.

For example, assuming an I4.0 factory process 140, as depicted in FIG. 14, may operate on a clock basis which is a multiple of the base stations 141 (s)TTI. However, the factory process 140 and the base station 141 may differ by a time offset. Therefore, one of the 3GPP-compliant devices in the I4.0 factory process 140 may be configured to adjust the clock of a (non-anchor) CC of the eNB 140 by a time offset.

Figure 15:
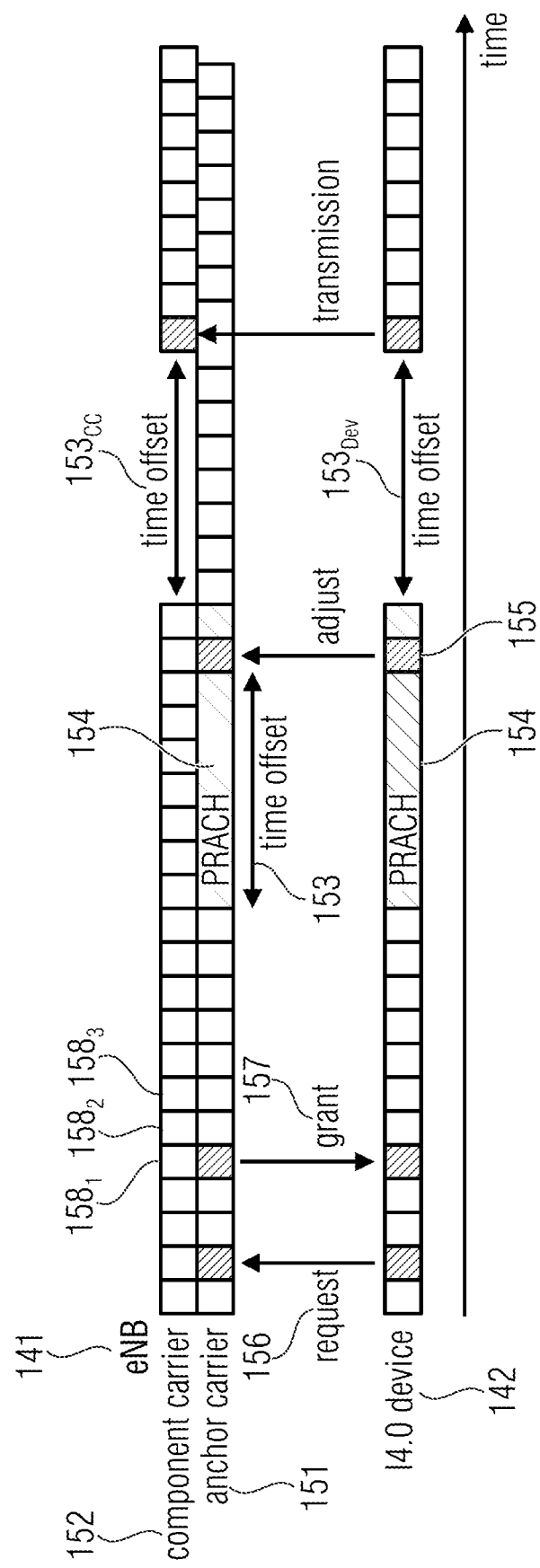
FIG. 15 shows an example procedure to adjust clock of a component carrier by time offset through an external entity (e.g. I4.0 device) according to an embodiment.

FIG. 15 shows an exemplary procedure, how the time offset can be set to a (non-anchor) CC 152 of the eNB 141 according to embodiments. As can be seen, the eNB141 comprises exemplarily one component carrier 152 and one anchor carrier 151. The eNB 141 is configured to allocate transmission resources of the one or more carriers 151, 152 to the I4.0 Device 142 for communication with the I4.0 Device 142 in units of transmission time intervals (TTI) $158_1$, $158_2$, $158_3$ into which the anchor and component carriers 151, 152 are temporally subdivided.

The I4.0 device 142 is connected to the anchor carrier 151 and requests to adjust the clock of the (non-anchor) CC 152 by a time offset 153. The I4.0 device 142 may do so by sending a request 156 to the eNB 141.

Following, the eNB 141 grants the adjustment, symbolized by reference numeral 157, and the I4.0 device 142 sets the time offset 153 by using the PRACH 154.

A signal (e.g. random access preamble) 155 is transmitted on the PRACH 154 and the offset 153 to the beginning of the PRACH 154 denotes the time offset to adjust.

Following, said time offset 153 is set to the I4.0 device 142 and the (non-anchor) CC 152, which is indicated by reference numerals $153_{CC}$ and $153_{Dev}$. Thus, the devices $142_1$, $142_2$, $142_3$, $142_4$ of the I4.0 factory process 140 are able to communicate on their clock basis.

As an extension, the master clock can be additionally set on the primary/anchor carrier 151. However, this may currently lead to a reconfiguration/reboot of the whole system.

In other words, embodiments of the present invention may provide for a base transceiver 141 configured to communicate with user entity transceivers $142_1$, $142_2$, $142_3$, $142_4$ via one or more carriers 151, 152. Said base transceiver 141 is configured to allocate transmission resources of the one or more carriers 151, 152 to the user entity transceivers $142_1$, $142_2$, $142_3$, $142_4$ for communication with the user entity transceivers $142_1$, $142_2$, $142_3$, $142_4$ in units of transmission time intervals (TTI) $158_1$, $158_2$, $158_3$ into which the one or more carriers are temporally subdivided. The base transceiver 141 of this embodiment is further configured to temporally adjust the begin and/or end of transmission time intervals (TTI) of at least one of the one or more carriers 151, 152 depending on one more signals 155 received from one of the user entity transceivers $142_1$, $142_2$, $142_3$, $142_4$.

Stated from a terminal side, i.e. from a user entity side of one or more of the above described user entities (e.g. I4.0 Devices) $142_1$, $142_2$, $142_3$, $142_4$, embodiments of the invention provide for a user entity transceiver $142_1$, $142_2$, $142_3$, $142_4$ configured to communicate with a base transceiver system 141 via allocated transmission resources in units of transmission time intervals (TTI) into which the one or more carriers 151, 152 are temporally subdivided. The user entity transceiver $142_1$, $142_2$, $142_3$, $142_4$ according to this embodiment is configured to temporally adjust the begin and/or end of transmission time intervals (TTI) of at least one of the one or more carriers 151, 152 to be aligned to a local clock, e.g. by depending on the local clock, send one more signals 155 to the base transceiver system 141 on the basis of which the base transceiver system 141 is to perform the temporal adjustment on a base transceiver system's 141 side.

Additionally or alternatively, the user entity transceiver $142_1$, $142_2$, $142_3$, $142_4$ according to this embodiment is configured to temporally adjust the begin and/or end of transmission time intervals (TTI) of at least one of the one or more carriers 151, 152 to be aligned to a local clock, e.g. by temporally adjusting the begin and/or end of transmission time intervals of the at least one of the one or more carriers 151, 152 to correspond to the local clock on an user entity transceiver's $142_1$, $142_2$, $142_3$, $142_4$ side.

2.2.1.2 Set Idle Time for Arbitrary System Clocks

Figure 16:
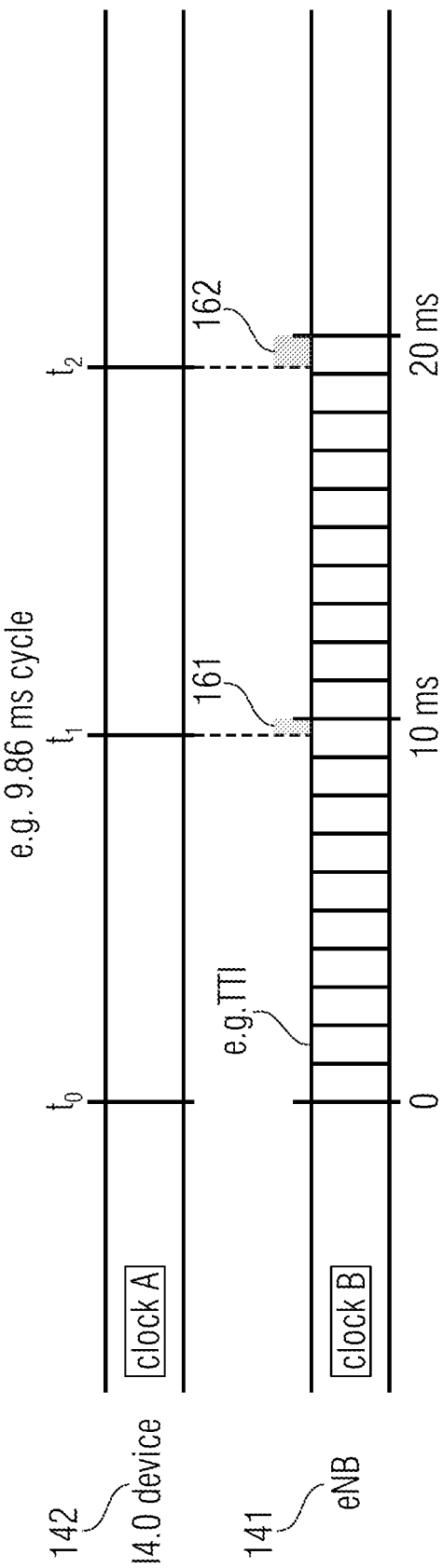
FIG. 16 shows an example of different clocks with same start time of eNB and external entity (e.g. I4.0 device)

In general, a clock of an arbitrary system is not a multiple of (s)TTI. If a time offset is applied, two systems with different clocks are still diverging. FIG. 16 shows this effect, where an I4.0 device 142 operates on a different cycle than the eNB 141. Therefore, a mismatch 161 occurs already after the first cycle.

According to the example of FIG. 16, the eNB 141 operates on an internal clock cycle of 10 ms while the I4.0 Device 142 operates on an internal clock cycle of 9.86 ms. As can be seen, said time offset of 0.14 ms leads to a mismatch 161 already after the first cycle. Of course, the offset doubles to 0.28 ms (indicated by reference numeral 162) already after the second cycle, and so on.

Embodiments may be described for compensating this effect. In addition to section 2.2.1.1, embodiments may provide for inserting an idle time 171 to the base station 141, as exemplarily shown in FIG. 17.

The idle time 171 can be signaled through a transmission on the physical channel like the PRACH 154 in 3GPP LTE. In particular, the transmission cycle of a (non-anchor) component carrier (CC) 152 of an eNB 141 may consist of a transmission/reception time and an idle time 171. The idle time 171 compensates the misalignment between application cycle and size of the TTIs $158_1$, $158_2$, $158_3$.

Figure 17:
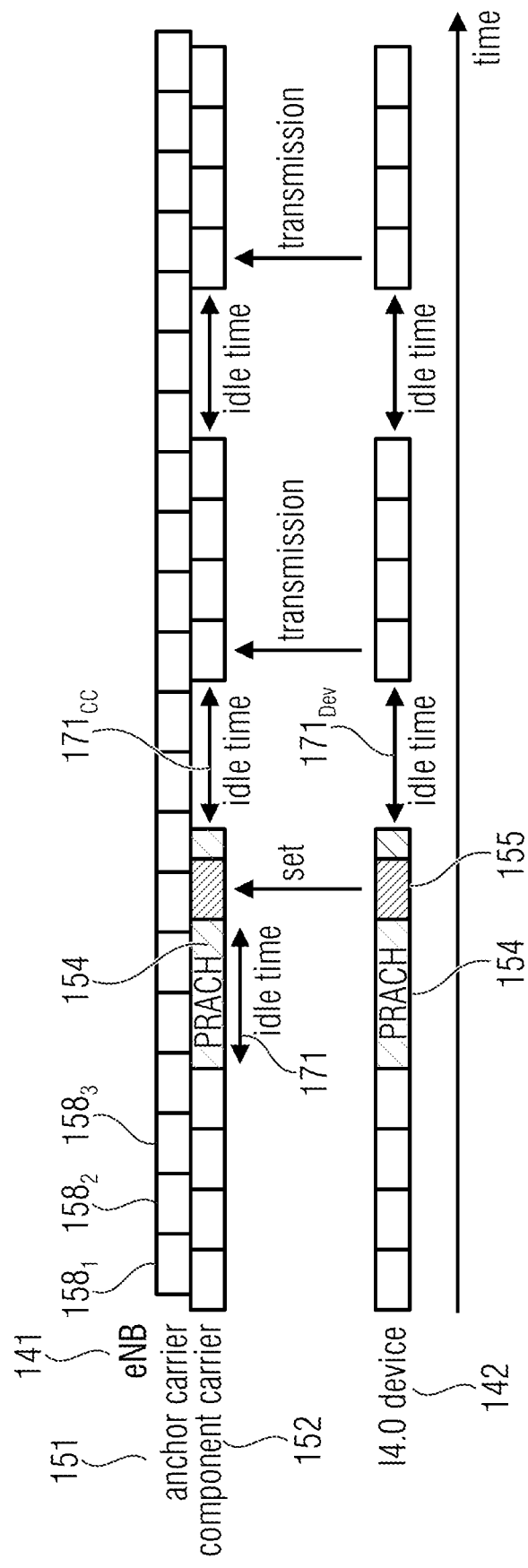
FIG. 17 shows an example procedure to set idle time to component carrier by external entity (e.g. I4.0 device) according to an embodiment.

FIG. 17 shows an exemplary procedure, how the idle time 171 of a (non-anchor) CC 152 of the eNB 141 may be configured. The I4.0 device 142 transmits a signal (e.g. random access preamble) 155 on the PRACH 154, signaling the idle time 171 of the (non-anchor) CC 152.

After the signaling, the (non-anchor) CC 152 and the I4.0 device 142 may incorporate the idle time 171 in their transmission cycle, as symbolized by reference numerals $171_{CC}$ and $171_{Dev}$. Thus, the devices of the I4.0 factory process are able to communicate on their arbitrary clock basis.

According to the embodiments described with reference to FIGS. 15 and 17 above, the signal (e.g. a random access preamble) 155 may be transmitted on the PRACH 154 for determining the offset 153 or idle time 171, respectively.

According to such an embodiment, the inventive base transceiver system 141 is configured to perform the time adjustment (e.g. by providing an offset 153 or idle time 171) depending on a time at which the one of the user entity transceivers 142 is free to send a random access signal 155 during a window of a physical resource channel (e.g. PRACH) 154 in a state of synchronization between base transceiver system 141 and user entity transceiver 142.

From an UE side, embodiments may provide for an UE transceiver 142 configured to, depending on the local clock, set a time at which the user entity transceiver 142 sends a random access signal 155 during a window of a physical resource channel 154 in a state of synchronization between base transceiver system 141 and the user entity transceiver 142.

Additionally or alternatively, the base transceiver system 141 and the UE transceiver 142 may both be configured to perform the adjustment (e.g. by means of the offset 153 or idle time 171) depending on higher layer signaling.

In other words, the signal initiating the provision of an offset 153 or idle time 171 can also be a signal, or even more than one signal, different from the above described random access signal 155 in the PRACH 154.

Accordingly, a further embodiment may provide for a base transceiver 141 being configured to set a clock depending on one or more signals 155 received from the user entity transceiver 141 so that the end or beginning of subsequent transmission time intervals are aligned to the clock with leaving idle times 171 between aligned transmission time intervals and temporally neighboring transmission time intervals.

2.2.1.3 Incorporate Timing Advance

The embodiments described above in section 2.2.1.1 and section 2.2.1.2 may not consider the time delay caused by the air transmission itself (due to the speed of light).

Figure 18:
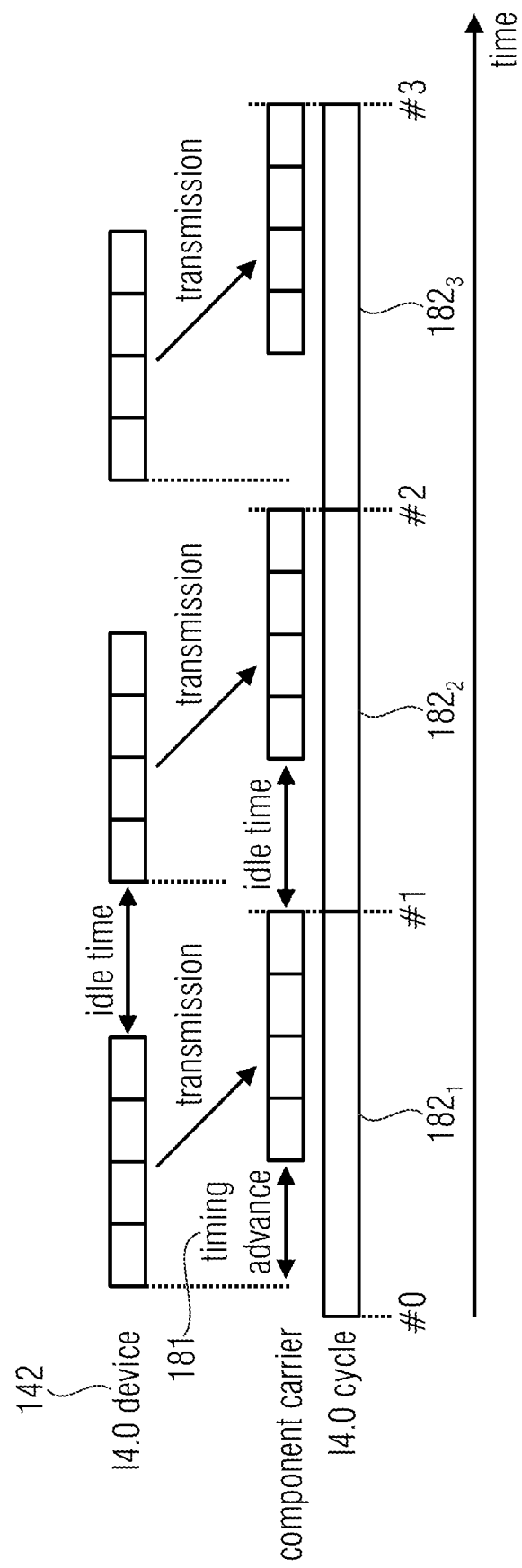
FIG. 18 shows an alignment of component carrier and I4.0 cycle considering timing advance according to an embodiment.

In communication systems like 3GPP LTE the effect is compensated by timing advance 181 signaled through the PRACH 154, as exemplarily depicted in FIG. 18.

The eNB 141 can consider the timing advance 181 of the I4.0 device 142, which adjusted the eNB clock by exploiting the concepts of section 2.2.1.1 and section 2.2.1.2. Therefore, the transmission cycle of the eNB CC terminates with the I4.0 cycle, so that the transmission of all devices communicating with the eNB 141 are received at the end of each I4.0 cycle $182_1$, $182_2$, $182_3$ (cf. FIG. 18).

Usually, in I4.0 all the transmission shall be terminated at the end of an I4.0 cycle $182_1$, $182_2$, $182_3$. However, it could be also beneficial to align the component carrier to beginning of the I4.0 cycle $182_1$, $182_2$, $182_3$.

2.2.1.4 Support of Multi-Stage Application Cycles

Further PRACH messages like in section 2.2.1.2 can support multi-stage application cycles, like alternating idle time between two values. Therefore, the entity has to signal the pattern of idle time to be applied. In addition, the PRACH message 154 may signal the corresponding fractional offset to the eNB 141.

Furthermore, the above described embodiments have been exemplarily described by referring to the exemplary illustrations of FIGS. 14 to 18. According to a further embodiment, a base transceiver system may comprise more than one base station transceiver 141 which may be configured to communicate with one or more user entity transceivers $142_1$, $142_2$, $142_3$, $142_4$ in the manner as described above.

According to such an embodiment, a base transceiver system may be provided which is configured to communicate with the user entity transceivers $142_1$, $142_2$, $142_3$, $142_4$ via an aggregation of an anchor carrier 152 at a first base transceiver 141 and component carriers at a second base transceiver. The base transceiver system may further be configured to send configuration signals 155 for configuring the anchor and component carriers 151, 152 at the user entity transceiver $142_1$, $142_2$, $142_3$, $142_4$, to the user entity transceiver $142_1$, $142_2$, $142_3$, $142_4$ via the anchor carrier 151, wherein the at least one carrier the end and/or beginning of TTIs of which is temporally adjusted is the component carrier 152.

Figure 19C:
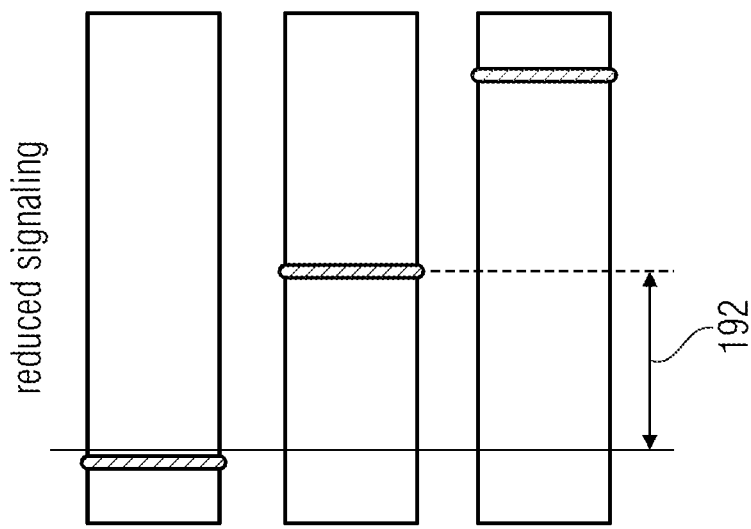
FIG. 19C shows an example of maximum access time for reduced signaling RACH signal slots according to an embodiment.
Figure 19B:
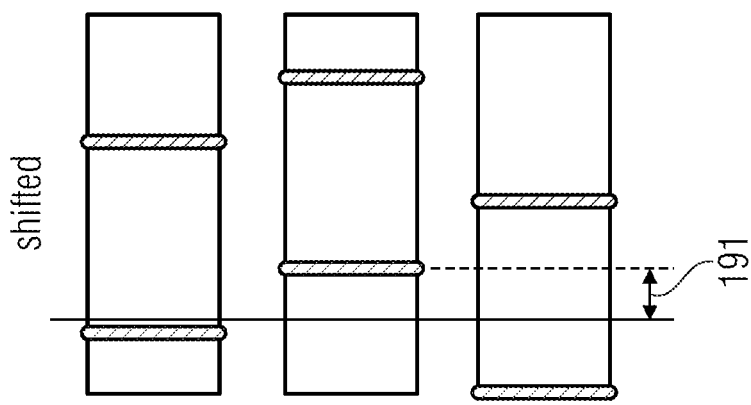
FIG. 19B shows an example of maximum access time for shifted RACH signal slots according to an embodiment.
Figure 19A:
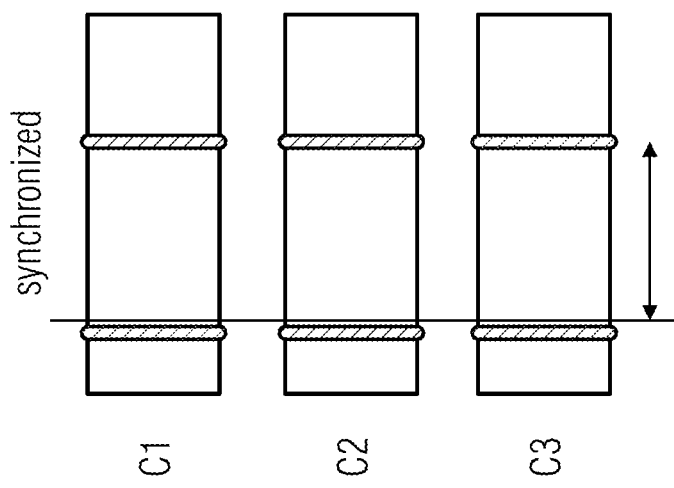
FIG. 19A shows an example of maximum access time for synchronized RACH signal slots according to an embodiment.

2.2.2 Time-Offsets Only for a Set of Physical Layer Channel on Appreciated Carriers The general scheme described in section 2.2.1 can also be used for special signaling intervals e.g. PDCCH signaling or broadcast control information, as exemplarily depicted in FIGS. 19A to 19C.

By selecting time-shifted control signaling relevant physical layer channels of carriers in common CA mode, a UE has accelerated access to the needed signaling information while maintaining backward compatibility. Also, the random access procedure as done in physical random access channel (PRACH) in UL can be accelerated.

An example is shown in FIG. 19B for the shifted PRACH on 3 carriers C1, C2, C3. Here, the shift 191 is done in a constant way such that there are three PRACH access options within one TTI for a UE that uses three carriers C1, C2, C3.

Alternatively, the signaling can be reduced while keeping the same access time.

Accordingly, embodiments provide for an apparatus configured to perform data transmission or reception via allocations of transmission resources of aggregated carriers C1, C2, C3, wherein at least one of physical layer channels of the aggregated carriers C1, C2, C3, radio frame bases of physical broadcast channels of the aggregated carriers C1, C2, C3, and physical random access channels (e.g. PRACH) of the aggregated carriers C1, C2, C3 are temporally mutually offset.

For example in FIG. 19B, the channels of carriers C1, C2 and C3 are temporally shifted by time shift 191. As depicted in FIG. 19C, only parts of the channels may be shifted by time shift 192, wherein only those shifted parts may be available which may therefore also be referred to as a reduced signaling.

Independent of whether physical channels, as depicted in FIGS. 19A to 19C, or communication resources like 'U', 'D', 'S', 'SN', as explained above with reference to the other figures, may be transmitted, embodiments of the invention provide for inbound data being sent at the earliest point in time by using the subsequent TTI or subframe of at least one of available further aggregated carriers.

In other words, embodiments provide for an apparatus comprising at least one base station and being configured to select for inbound data ready to be transmitted at a predetermined time instant, one of the aggregated carriers ($32_1$, $32_2$, $32_3$) such that the one of the aggregated carriers ($32_1$, $32_2$, $32_3$) has a predetermined transmission time interval which starts earliest on or after the predetermined time instant, and transmit the inbound data in the predetermined transmission time interval.

From an UE point of view, embodiments provide for a mobile terminal being configured to select for inbound data ready to be transmitted at a predetermined time instant, one of the aggregated carriers ($32_1$, $32_2$, $32_3$) such that the one of the aggregated carriers ($32_1$, $32_2$, $32_3$) has a predetermined transmission time interval which starts earliest on or after the predetermined time instant, and request at the base station system (30) a transmission of the inbound data in the predetermined transmission time interval.

2.2.3 Further Embodiments

FIG. 20 shows a further embodiment for providing a time offset 153 or idle time 171, respectively.

According to this embodiment, the eNB 141 may be configured to send a first interrogation signal 201. The user equipment device 142 may be configured to respond to said first interrogation signal 201 by sending a first response signal 202 to the eNB 141. The time span between receiving the first interrogation signal 201 and sending the first response signal 202 is denoted with $\Delta t_1$ in FIG. 20.

The eNB 141 may further be configured to send a second interrogation signal 203. The user equipment device 142 may be configured to respond to said second interrogation signal 203 by sending a second response signal 204 to the eNB 141. The time span between receiving the second interrogation signal 203 and sending the second response signal 204 is denoted with $\Delta t_2$ in FIG. 20.

As can be seen, the time span $\Delta t_2$ is larger than the time span $\Delta t_1$. In other words, the response time $\Delta t_2$ of the second response signal 204 for responding to the second interrogation signal 203 is delayed when compared to the response time $\Delta t_1$ of the first response signal 202 for responding to the first interrogation signal 201. This difference between $\Delta t_1$ and $\Delta t_2$ may depend on the desired clock setting and may represent a communication delay. It may also be referred to as an offset 153 or idle time 171, respectively.

Additionally or alternatively, the base transceiver system eNB 141 may send an information regarding the communication delay to the user equipment device 142. The user equipment device 142 may receive said information subsequent to responding to the first interrogation signal 201, i.e. subsequent to sending the first response signal 202.

The user equipment device 142 may determine a reference sending time on the basis of the temporal grid and the communication delay. Following, the user equipment device 142 may send the second response signal 204 to the eNB 141 delayed relative to the reference sending time depending on the local clock.

Furthermore, the end and/or beginning of the TTIs may then be adjusted depending on said local clock setting on the user equipment side 142.

In other words, embodiments provide for an user entity transceiver 141 configured to respond to a first interrogation signal 201 sent by the base transceiver system 141 by sending a first response signal 202 to the base transceiver system 141. The user entity transceiver 141 of this embodiment may further be configured to perform the temporal adjustment by responding to a second interrogation signal 203 sent by the base transceiver system 141 by sending a second response signal 204 to the base transceiver system 141 in a manner delayed relative to the responding to the first interrogation signal 201 by a time delay depending on the wanted clock setting.

Additionally or alternatively, The user entity transceiver 141 of this embodiment may be configured to receive an information on a communication delay from the base transceiver system 141 subsequent to the responding to the first interrogation signal 201, determining a reference sending time on the basis of the temporal grid and the communication delay and sending a second response signal 204 to the base transceiver system 141 delayed relative to the reference sending time depending on the local clock.

In either way, the user entity transceiver 141 of this embodiment may be configured to adjust the end and/or beginning of TTIs depending on the local clock setting on the UE transceiver's side 142.

From a eNB side 141, embodiments provide for a base transceiver system 141 configured to perform the temporal adjustment by determining a time past $\Delta t_1$ between a first interrogation signal 201 sent by the base transceiver system 141 and a first response signal 202 sent by the user entity transceiver 142 responsive to the first interrogation signal 201.

The base transceiver system 141 is further configured to perform the temporal adjustment on the basis of a prolongation ($\Delta T = \Delta t_2 - \Delta t_1$) of a time past $\Delta t_2$ between a second interrogation signal 203 sent by the base transceiver 141 and a second response signal 204 sent by the user entity transceiver 142 responsive to the second interrogation signal 203, relative to the first time delay.

Additionally or alternatively, the base transceiver system 141 is configured to perform the temporal adjustment on the basis of a time past $\Delta t_2$ between the second response signal 204 sent by the user entity transceiver 142 subsequent to the first response signal 202, upon the base transceiver system 141 having informed the user entity transceiver 142 on the first time delay 153, 171 on the one hand and a reference arrival time of the second response signal 204 determined by the base transceiver system 141 on the basis of the temporal grid.

2.3 Extended Dual TDD Operation Using Multiple (e.g. Two or More) Antennas with Carrier Aggregation and Inverted Switching Points FIG. 21 shows some embodiments for dual TDD operation using two or more antennas.

The top diagram 211 shows a permanent single stream in Uplink and Downlink operation, wherein antenna 1 is operated in transmit mode and antenna 2 is operated in receive mode.

The diagram 212 in the middle shows a permanent dual stream Uplink and Downlink operation switching between two transmit antennas on CC-A and two antennas on CC-B.

The diagram 213 at the bottom shows a permanent dual stream Uplink and Downlink operation using one transmit antenna on CC-A and another transmit antenna on CC-B.

In FIG. 21, each of the two or more antennas as mentioned above may be switched such that one antenna is in receive mode on CC-A while the other is in transmit mode on CC-B. In case of four Antennas at the base station 141 or terminal (e.g. UE 142) this will allow for a continuous dual stream downlink and uplink transmission at the same time keeping UL and DL on different CC.

As an example: if CC-A was 1.8 GHz and CC-B was 2.6 GHz then an OOB emission mask should decouple the UL and DL streams even without explicit filters due to the significant distance in frequency. In case of full-duplex (self-interference cancellation mechanism) capabilities the enhanced self-interference cancelation can be applied over a quasi constant channel between the "de-facto" permanently as transmitter operated antennas and the permanently as receiver operated antennas.

Additionally or alternatively the TDD switching may not be performed between transceiver and antenna but instead in base band between the output of the CCs. In this way real TDD switches can be either omitted or can have switching slope support of standard TDD frame structures.

At one end of the transmission link, either UE side 142 or base station side 141, the CCs might be allocated to different/distributed antennas or sites (access points) in order to provide sufficient decoupling between Tx and Rx operating on CCs close to each other.

Additionally or alternatively, two sufficiently decoupled antennas may be used within one device with UL on CC-A and DL on CC-B in "quasi" half-duplex mode allowing for continuous single stream UL and DL.

Further additionally or alternatively, in case of adjacent CCs used for UL and DL operation at the same time, the scheduler may support improved UL-DL interference decoupling by appropriate PRB allocation, similar to section 2.1.3 described above.

According to such dual stream, or dual TDD, operation embodiments of the invention provide for a transceiver being a base station system 141, wherein said base station system 141 comprises one or more base stations with a plurality of antenna ports and configured to distribute uplink times and downlink times of the aggregated TDD carriers onto the plurality of antennas such that exclusively uplink times are attributed to a first subset of the plurality of antennas and exclusively downlink times are attributed to a second subset of the plurality of antennas, the first and second subset being disjoint.

Further embodiments may provide for a transceiver being a mobile terminal 142 configured for communicating with a third party device, wherein the third party device is a base station system comprising one or more base stations with a plurality of antenna ports. The transceiver 142 of this embodiment may be configured to distribute uplink times and downlink times of the aggregated TDD carriers onto the plurality of antennas such that exclusively uplink times are attributed to a first subset of the plurality of antennas and exclusively downlink times are attributed to a second subset of the plurality of antennas, the first and second subset being disjoint.

The above mentioned examples and embodiments have been exemplarily described with reference to existing networks of the fourth generation, the so-called 4G or LTE and LTE-Advanced and 4.5G LTE-Advanced Pro networks. Of course, all of the concepts described herein may also be used in mobile networks of the fifth generation, the so-called 5G or New Radio (NR) networks.

The 5G NR networks may enable much shorter latencies than currently existing 4G networks. For instance, as explained with reference to FIG. 1, LTE may support a fixed TTI of 1 ms. An 5G NR network may use shorter TTIs, i.e. the so-called shortened TTIs (sTTI) which have been explained above, inter alia with reference to FIG. 4. For example, it may be possible to provide a transmission latency comparable to six shortened TTI, as exemplarily shown on the right hand side of FIG. 4. A number of six shortened TTI is only mentioned as an example here, whereas the 3GPP strives to provide up to eight shortened TTI (sTTI, 1.14 ms) with 143 µs sTTi and more. Accordingly, the 5G NR networks may exploit the sTTI as described herein.

As it was explained further above with reference to FIG. 7, a LTE-compatible standard 1 ms subframe may comprise two slots, wherein each slot may comprise seven symbols. This subframe structure is again shown in FIG. 22 denoted with reference numeral 220A. It shows a subframe 220A according to 4G LTE or LTE-Advanced, wherein the subframe 220A comprises a slot 221, and wherein each slot 221 comprises seven symbols 222.

Figure 22:
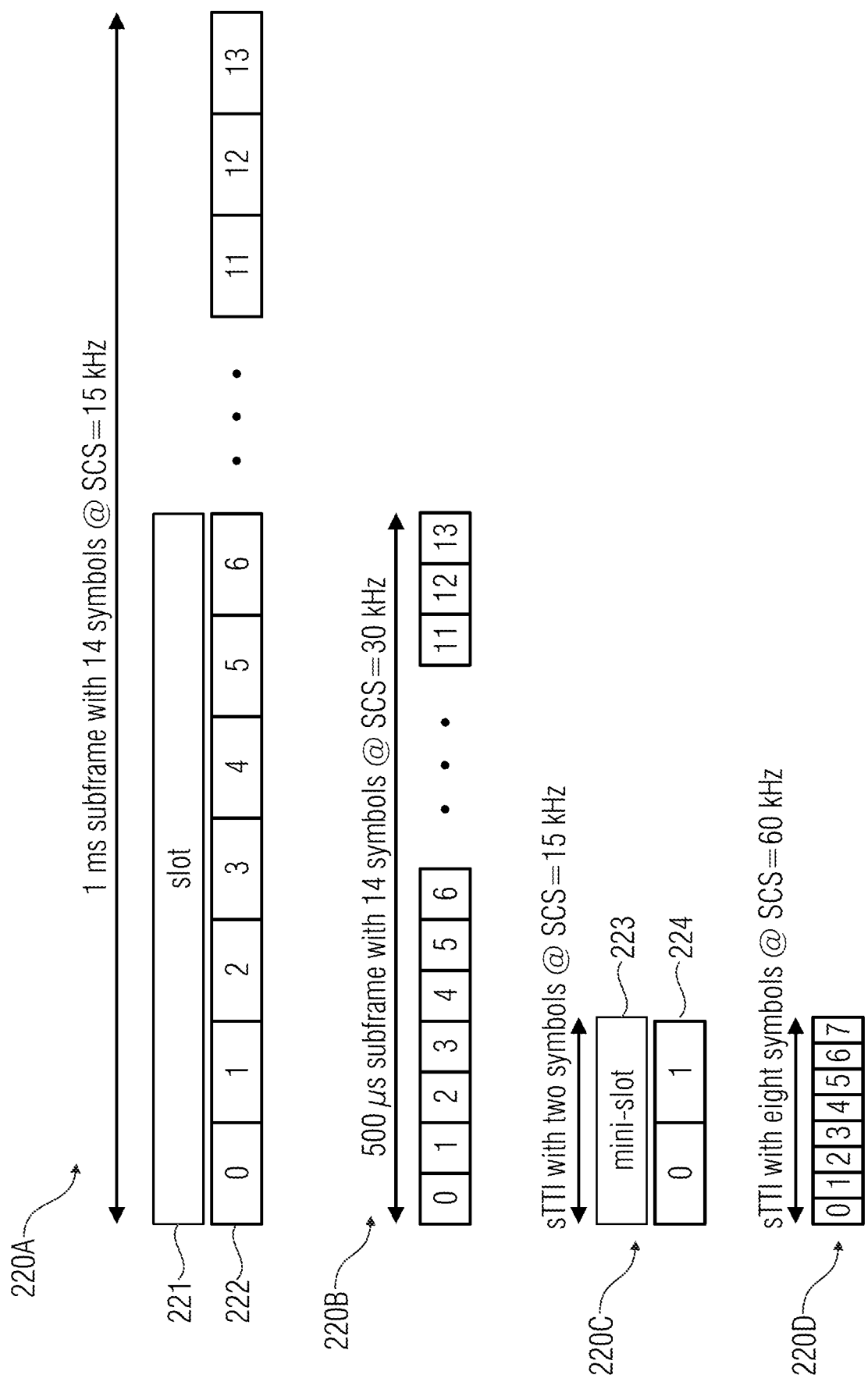
FIG. 22 shows a schematic diagram with subframes, slots and different TTI.

Other services or network standards, in particular NR, may be configured to use a shorter TTI, for instance a 500 µs TTI instead of the aforementioned standard LTE-compatible 1 ms TTI or subframe 220A, respectively. Such an example is shown in FIG. 22, denoted with reference numeral 220B. In comparison to the standard LTE-compatible 1 ms subframe 220A, the TTI of this example is shortened by exactly the half, i.e. shortened to 500 µs instead of 1 ms. However, for this purpose the so-called subcarrier spacing (SCS) has to be doubled from 15 kHz for the standard LTE-compatible 1 ms subframe 220A to 30 kHz for this shortened 500 µs subframe 220B.

However, 5G NR networks may exploit further possibilities for providing shorter TTIs, namely the above mentioned sTTI, for example by reducing the length of the slots. Accordingly, subframes used in 5G NR networks may use so-called mini-slots. An exemplary subframe using a mini-slot is shown in FIG. 22, denoted with reference numeral 220C.

This 5G NR subframe 220C uses a mini-slot 223 which comprises only two symbols (e.g. OFDM-symbols) 224 instead of the above mentioned seven symbols 222 comprised by the LTE-compatible 1 ms standard subframe 220A. These two symbols 224 of the 5G NR subframe 220C may have a sTTI of temporal length T≈142 µs.

Of course, the depicted mini-slot 223 was only shown here as an example. Generally, mini-slots 223 may have different lengths depending on the used carrier frequencies. Mini-slots may have a length of exactly one symbol (e.g. one OFDM symbol), e.g. typically used for frequencies above 6 GHz, or mini-slots may have a length of two up to slot-length−1 symbols, e.g. if the carrier frequency is below 6 GHz. This may depend on the URLLC requirements (URLLC: Ultra Reliable Low Latency Communications), where at least a mini-slot length of two symbols shall be supported for frequencies below 6 GHz.

In addition, this concept may be combinable with a subcarrier spacing (SCS) depending on the numerology. For 5G NR, the SCS may vary, depending on the used carrier frequency, according to the following formula:

$$f(n)=15\text{ kHz}\cdot 2^n; \text{ where } n \text{ is a non-negative integer}$$

An example for a sTTI combined with a variable SCS is shown in FIG. 22, denoted with reference numeral 220D. It shows a further 5G NR subframe 220D with eight symbols. Accordingly, the SCS may have to be increased to 60 kHz.

Furthermore, FIG. 23 shows several examples in which frequency bands which SCS may be used (k=kHz).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

| List of Acronyms and Symbols | |
|---|---|
| BS | Base Station* |
| eNB | Evolved Node B (3GPP base station) |
| LTE | Long-Term Evolution |
| UE | User Equipment (User Terminal) |
| DwPTS | Downlink Pilot Time Slot |
| UpPTS | Uplink Pilot Time Slot |
| GP | Guard Period |
| CA | Carrier Aggregation |
| CC | Component Carrier |
| TDD | Time Division Duplex |
| FDD | Frequency Division Duplex |
| MIMO | Multiple Input Multiple Output |
| OFDM | Orthogonal Frequency Division Duplexing |
| CQI | Channel Quality Information |
| DCI | Downlink Control Information |
| UL | Uplink |
| DL | Downlink |
| (s)TTI | (short) Transmission Time Interval |
| PSS | Primary Synchronization Signal |
| SSS | Secondary Synchronization Signal |
| PRB | Physical Resource Block |
| (P)RACH | (Physical) Random Access Channel |
| PDCCH | Physical Downlink Control Channel |

*Note, the term eNB is a general term for a base station (BS) of the communication network (used in the LTE context), for 5G (New Radio) communication networks, the term gNB is used. All three terms BS, eNB and gNB may be used as synonym in this description.

| References | |
|---|---|
| [1] | 3GPP TS36.211 V13.1.0 (2016 March), "E-UTRA; Physical channels and modulation", p. 13 f. |
| [2] | 3GPP TR36.881 V0.6.0 (2016 February), "Study on latency reduction techniques for LTE". |
| [3] | C. Johnson, "Long Term Evolution in Bullets", 2nd edition, 2012, p. 289 ff. |
| [4] | http://www.sharetechnote.com/html/LTE_TDD_Overview.html |
| [5] | http://niviuk.free.fr/lte_resource_grid.html |

The invention claimed is:

1. A transceiver configured to:
perform wireless data communication with a third party device by aggregating time division duplex (TDD) carriers comprising different temporal distribution of uplink times and downlink times,
the transceiver being a base station, wherein the third party device is a mobile terminal and the transceiver is configured to configure the TDD carriers and send configuration signals for correspondingly configuring the TDD carriers at the third party device, to the third party device via at least one of the TDD carriers,
wherein the configuration signals comprise one or more of:
user allocation signals allocating spectrotemporal segments of the TDD carriers to different users, and
frame setting signals indicating a temporal distribution of uplink times and downlink times within one or more upcoming frames of the TDD carriers.

2. The transceiver of claim 1, wherein the TDD carriers are temporally structured into consecutive frames of a frame length which is equal between the TDD carriers, and wherein the frames of a first and a second of the TDD carriers are temporally shifted to each other.

3. The transceiver of claim 2, wherein temporally overlapping frames of the TDD carriers provide a temporal alternation between uplink and downlink phases which is equal between the TDD carriers.

4. The transceiver of claim 2, wherein the frames of the first and the second of the TDD carriers are temporally shifted to each other by an amount smaller than the frame length.

5. The transceiver of claim 2, further configured to switch between different frame configurations at transitions between immediately consecutive frames of the TDD carriers, wherein frames of the first TDD carriers which temporally overlap frames of the second TDD carriers are of the same frame configuration, the different frame configurations differing in temporal alternation between uplink and downlink phases.

6. The transceiver of claim 5, wherein the different frame configurations between which the transceiver switches form a group of frame configurations, wherein at least a majority of frame configurations of said group provides, in one or more contiguous and—relative to the frame borders—temporally collocated frame segments an equal scheduling of uplink and downlink, wherein the frames of the first and second TDD carriers are temporally mutually shifted by a time amount corresponding to a temporal length of the one or more contiguous—and relative to the frame borders—temporally collocated frame segments.

7. The transceiver of claim 2, wherein the transceiver supports different frame configurations out of which the frames of the first TDD carrier and the frames of the second TDD carrier are selected so that frames of the first TDD carrier are of a first frame configuration and the frames of the second TDD carrier are of a second frame configuration, wherein the transceiver is configured to adapt the amount by which the frames of the first and the second TDD carriers are temporally shifted to each other depending on the selection of the first and second frame configurations out of the different frame configurations.

8. The transceiver of claim 1, wherein the base station is configured to blank subcarriers at an edge of a frequency band of one or more carriers being spectrally adjacent to at least one of the TDD carriers being aggregated, wherein the one or more carriers comprise at least another one of the aggregated TDD carriers or another carrier via which the base station communicates with a further third party device.

9. The transceiver of claim 1, belonging to a system comprising at least two base stations and a backhaul network, wherein the third party device is a mobile terminal and the transceiver is configured to provide a first TDD carrier at a first base station and a second TDD carrier at a second base station, to configure the first and second TDD carriers and to send first configuration signals for correspondingly configuring the first and second TDD carriers at the third party device, to the third party device via the first TDD carrier, and sending second configuration signals for correspondingly configuring the second TDD carrier at the third party device, to the third party device via the second TDD carrier, wherein the transceiver is configured to send the first configuration signals to the third party device less frequently than the second configuration signals.

10. The transceiver of claim 1, wherein the TDD carriers are temporally structured into consecutive frames of a frame length which is equal between the TDD carriers, wherein temporally overlapping frames of the TDD carriers are temporally registered to each other to temporally coincide, wherein the transceiver is configured to switch between different frame configurations at transitions between immediately consecutive frames of the TDD carriers, wherein the different frame configurations between which the transceiver switches, form a group of frame configurations equally subdivided into a sequence of subframes, each subframe being associated with one of an uplink mode, a downlink mode and one or more special modes, the one or more special modes corresponding to a predetermined below-subframe temporal distribution of uplink and downlink, wherein the group of frame configurations comprises a first subset of frame configurations differing in distribution of, and frequency of, subframes associated with the uplink and downlink modes, and a second subset of frame configurations, the second subset comprising at least one inverted frame configuration for each frame configuration of the first subset.

11. The transceiver of claim 1, wherein the aggregated TDD carriers are selected so that a percentage of times an uplink is available to the transceiver on the aggregated TDD carriers or a percentage of times a downlink is available to the transceiver on the aggregated TDD carriers, is increased relative to each of the TDD carriers individually.

12. The transceiver according to claim 1, belonging to a base station system comprising one or more base stations with a plurality of antenna ports for a plurality of antennas and configured to distribute uplink times and downlink times of the aggregated TDD carriers onto the plurality of antennas such that exclusively uplink times are attributed to a first subset of the plurality of antennas and exclusively downlink times are attributed to a second subset of the plurality of antennas, the first and second subset being disjoint.

13. A transceiver configured to perform wireless data communication with a third party device by aggregating time division duplex (TDD) carriers comprising different temporal distribution of uplink times and downlink times, wherein different frame configurations between which the transceiver switches form a group of frame configurations equally subdivided into a sequence of subframes, each subframe being associated with at least one of an uplink mode, a downlink mode and a special mode, the special mode corresponding to a predetermined below-subframe temporal distribution of uplink and downlink, wherein at least a majority of the group of frame configurations differs in association of the subframes to the uplink mode, the downlink mode and the special mode with one or more contiguous and—relative to the frame borders—temporally collocated frame segments within which the subframes' association to the uplink mode, the downlink mode and the special mode being such that there is no—with respect to the frame borders—temporally collocated pair of subframes in the one or more contiguous and—relative to the frame borders—temporally collocated frame segments, of which one is associated with uplink mode while the other of the pair is associated with the downlink mode, wherein the frames of the first and second TDD carriers
- are mutually shifted by n times a subframe length with n corresponding to
- the number of subframes the one or more contiguous and—relative to the frame borders—temporally collocated frame segments is long, or
- the minimum number of subframes which when mutually temporally shifting two instantiations of the one or more contiguous and—relative to the frame boarders—temporally collocated frame segments of any of the group of frame configurations, results in an absence of any pair of subframes within a first instantiation and—after temporal shift—temporally collocated subframes within the second instantiation among which both are of the uplink mode, or both of the downlink mode.

14. A transceiver being belonging to a system comprising at least two base stations and a backhaul network, the transceiver being configured to perform wireless data communication with a third party device by aggregating time division duplex (TDD) carriers comprising different temporal distribution of uplink times and downlink times,
- wherein the third party device is a mobile terminal and the transceiver is configured to communicate with the third party device via a first TDD carrier at a first base station and via a second TDD carrier at a second base station, and wherein the transceiver is further configured to configure the first and second TDD carriers and send configuration signals for correspondingly configuring the first and second TDD carriers at the third party device, to the third party device via at least one of the TDD carriers,
- wherein at least one of the at least two base stations is configured to communicate with the third party device or another third party device over a further TDD carrier within a frequency band spectrally adjacent to a frequency band of one of the first and second TDD carriers with the further TDD carrier and the at least one of the first and second TDD carriers differing in temporal distribution of uplink times and downlink times, wherein the transceiver is configured to blank subcarriers at a frequency subband at an end of the respective frequency band of at least one of the further TDD carrier and the at least one of the first and second TDD carriers.

15. The transceiver of claim 14, wherein the first and second TDD carriers share the same frequency band or are on different frequency bands.

16. The transceiver of claim 15, wherein the first and second TDD carriers are on frequency bands separated from each other by more than 5 GHz.

17. The transceiver of claim 14, wherein at least one of the first and second base stations communicates via the respective one of the first and second TDD carriers with the third party device with spatially confined downlink transmissions over the TDD carrier onto a spatial beam, wherein the transceiver is configured to communicate with another third party device over a further TDD channel spatially confined to a further spatial beam, the further TDD carrier differing in temporal distribution of uplink times and downlink times from the respective TDD carrier.

18. The transceiver of claim 17, wherein the respective TDD carrier and the further TDD carrier share the same frequency band.

19. A transceiver configured to:
perform wireless data communication with a third party device by aggregating time division duplex (TDD) carriers comprising different temporal distribution of uplink times and downlink times,
the transceiver being a mobile terminal, wherein the third party device is a base station and the transceiver is configured to receive configuration signals from the third party device via at least one of the TDD carriers and configure the TDD carriers depending on the configuration signals,
wherein the configuration signals comprise one or more of:
- user allocation signals allocating spectrotemporal segments of the TDD carriers to different users, and
- frame setting signals indicating a temporal distribution of uplink times and downlink times within one or more upcoming frames of the TDD carriers.

20. A transceiver configured to:
perform wireless data communication with a third party device by aggregating time division duplex (TDD) carriers comprising different temporal distribution of uplink times and downlink times,
the transceiver being a mobile terminal, wherein the third party device is a system comprising at least a first and a second base station and a backhaul network and the transceiver is configured to communicate with the system via a first TDD carrier at the first base station and via a second TDD carrier at the second base station, wherein the transceiver is configured to receive configuration signals from the system via at least one of the TDD carriers and configure the first and second TDD carriers depending on the configuration signals,
wherein the configuration signals comprise one or more of:
- user allocation signals allocating spectrotemporal segments of the TDD carriers to different users, and
- frame setting signals indicating a temporal distribution of uplink times and downlink times within one or more upcoming frames of the TDD carriers.

21. The transceiver of claim 20, wherein the first and second TDD carriers share the same frequency band.

22. A transceiver configured to:
perform wireless data communication with a third party device by aggregating time division duplex (TDD) carriers comprising different temporal distribution of uplink times and downlink times,
the transceiver being a mobile terminal, wherein the third party device is a system comprising at least a first and a second base station and a backhaul network, and, wherein the transceiver is configured to communicate with the system via a first TDD carrier at the first base station and via a second TDD carrier at the second base station, wherein the transceiver is configured to receive first configuration signals from the system via at least one of the TDD carriers and second configuration signals from the system via at least one of the TDD carriers and configure the first and second TDD carriers depending on the first and second configuration signals and configure the first TDD carrier depending on the first configuration signal, wherein the transceiver is configured to derive the first configuration signals from the first TDD carrier less frequently than the second configuration signals from the second TDD carrier, wherein the configuration signals comprise one or more of:
- user allocation signals allocating spectrotemporal segments of the TDD carriers to different users, and
- frame setting signals indicating a temporal distribution of uplink times and downlink times within one or more upcoming frames of the TDD carriers.

23. A transceiver configured to:
perform wireless data communication with a third party device by aggregating time division duplex (TDD) carriers comprising different temporal distribution of uplink times and downlink times,
the transceiver being a mobile terminal, wherein the third party device is a base station system comprising one or more base stations with a plurality of antenna ports for a plurality of antennas, and the transceiver configured to distribute uplink times and downlink times of the aggregated TDD carriers onto the plurality of antennas such that exclusively uplink times are attributed to a first subset of the plurality of antennas and exclusively downlink times are attributed to a second subset of the plurality of antennas, the first and second subset being disjoint,
wherein the configuration signals comprise one or more of:
- user allocation signals allocating spectrotemporal segments of the TDD carriers to different users, and
- frame setting signals indicating a temporal distribution of uplink times and downlink times within one or more upcoming frames of the TDD carriers.

* * * * *